United States Patent [19]
Min et al.

[11] Patent Number: 5,815,305
[45] Date of Patent: Sep. 29, 1998

[54] THIN FILM ACTUATED MIRROR ARRAY IN AN OPTICAL PROJECTION SYSTEM AND METHOD FOR MANUFACTURING THE SAME

[75] Inventors: Yong-Ki Min; Yoon-Joon Choi, both of Seoul, Rep. of Korea

[73] Assignee: Daewoo Electronics Co., Ltd., Seoul, Rep. of Korea

[21] Appl. No.: 814,019

[22] Filed: Mar. 10, 1997

[51] Int. Cl.[6] ................................................. G02B 26/00
[52] U.S. Cl. ..................... 359/292; 359/295; 359/224; 359/850; 359/871; 310/328; 348/771
[58] Field of Search ..................... 359/292, 290, 359/291, 295, 224, 850, 846, 871; 310/328, 333; 348/771, 764

[56] References Cited

U.S. PATENT DOCUMENTS

| | | | |
|---|---|---|---|
| 4,492,435 | 1/1985 | Banton et al. | 359/295 |
| 5,078,479 | 1/1992 | Vuilleumier | 359/290 |
| 5,126,836 | 6/1992 | Um | 348/771 |
| 5,469,302 | 11/1995 | Lin | 359/846 |
| 5,550,680 | 8/1996 | Yoon | 359/850 |
| 5,604,623 | 2/1997 | Ji et al. | 359/224 |
| 5,661,611 | 8/1997 | Kim et al. | 359/871 |

FOREIGN PATENT DOCUMENTS

| | | |
|---|---|---|
| 0 741 310 | 11/1996 | European Pat. Off. . |
| WO 95/24798 | 9/1995 | WIPO . |

*Primary Examiner*—Loha Ben
*Attorney, Agent, or Firm*—Cushman Darby & Cushman Intellectual Property Group of Pillsbury Madison & Sutro, LLP

[57] ABSTRACT

The thin film AMA has a substrate, an actuator, a common line, and a reflecting member. The substrate has an electrical wiring and a connecting terminal and the actuator has a supporting layer, a bottom electrode, a top electrode, and an active layer. The common line is formed on a portion of actuator and is connected to top electrode. The electrical wiring and connecting terminal may not be damaged because actuator is formed on a portion of substrate adjacent to the portion where electrical wiring and connecting terminal are formed. The voltage drop of a second signal can be minimized because common line is formed thickly on a portion of actuator, so a sufficient second signal is applied to top electrode. The flatness of reflecting member may be enhanced because reflecting member is formed on a second sacrificial layer.

29 Claims, 19 Drawing Sheets

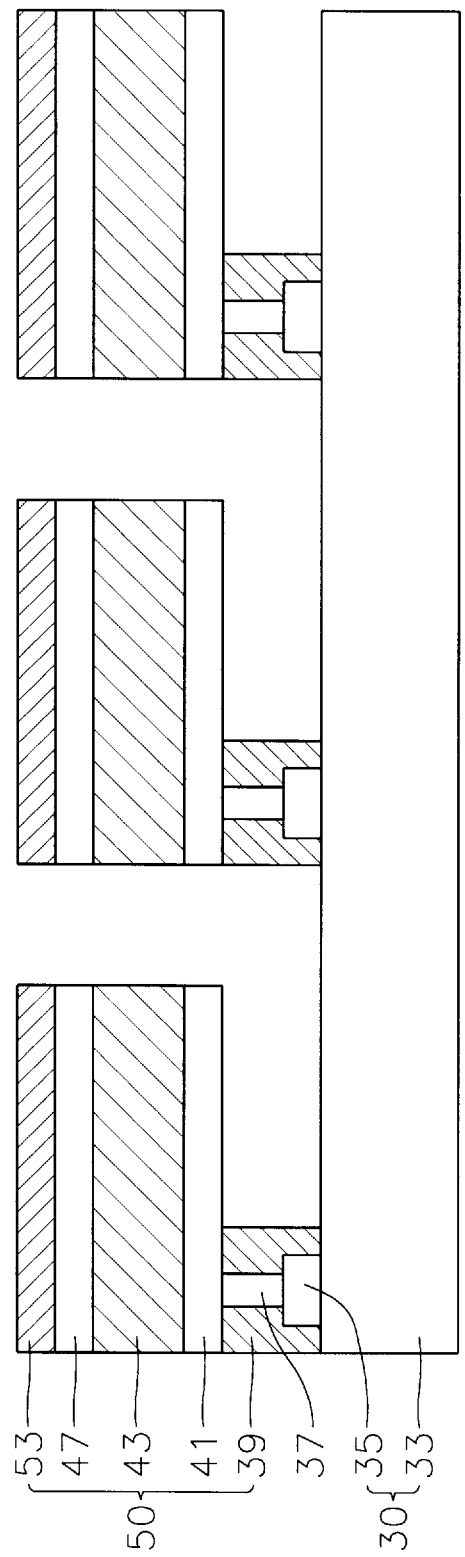

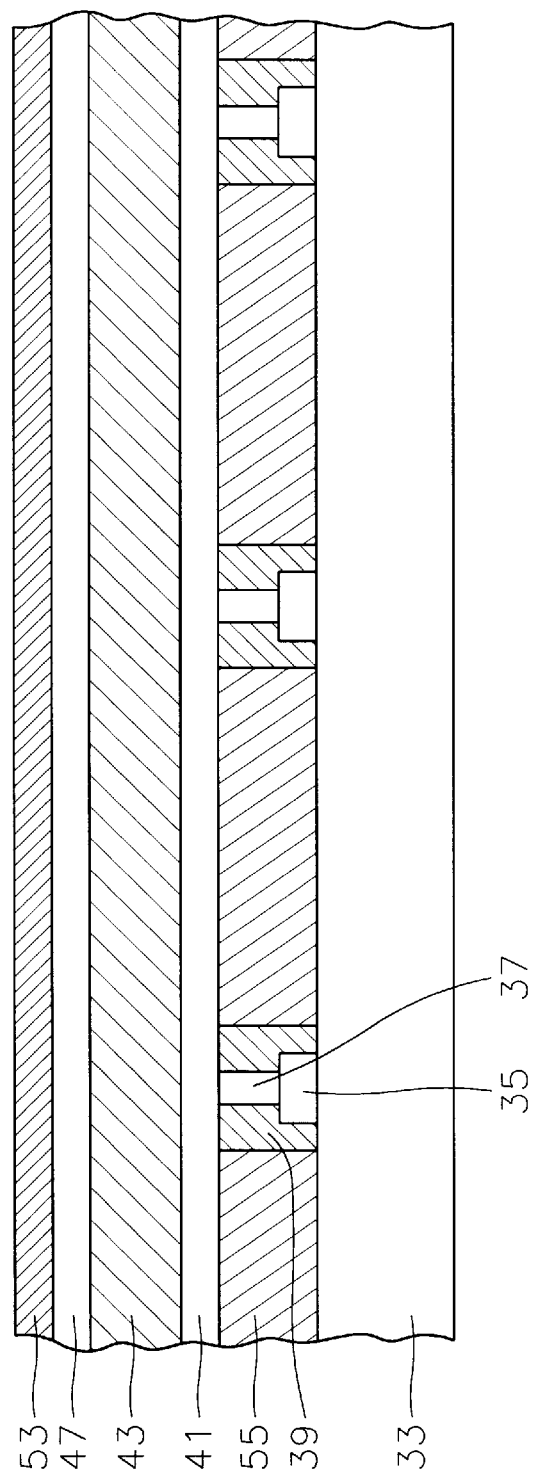

THIN FILM ACTUATED MIRROR ARRAY IN AN OPTICAL PROJECTION SYSTEM AND METHOD FOR MANUFACTURING THE SAME

BACKGROUND OF THE INVENTION

The present invention relates to a thin film actuated mirror array in an optical projection system and to a method for manufacturing the same, and more particularly to a thin film actuated mirror array in an optical projection system having a thick common line formed on a first portion of an actuator which is formed on a portion of a substrate adjacent to a portion in which an electrical wiring and a connecting terminal are installed, and a reflecting member formed by using a second sacrificial layer, so a voltage drop in the common line and a damage of the electrical wiring can be prevented and a flatness of the reflecting member and a quality of a picture projected onto a screen are increased, and to a method for manufacturing the same.

In general, light modulators are divided into two groups according to their optics. One type is a direct light modulator such as a cathode ray tube (CRT), the other type is a transmissive light modulator such as liquid crystal display (LCD). The CRT produce superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5%, the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from light source 1 passes a first slit 3 and a first lens 5 and is divided into red, green, and blue lights according to the Red Green Blue (R G B) system of color representation. After the divided red, green, and blue lights are respectively reflected by a first mirror 7, a second mirror 9, and a third mirror 11, the reflected light is respectively incident on AMA devices 13, 15 and 17 corresponding to the mirrors 7, 9 and 11. The AMA devices 13, 15 and 17 tilt mirrors installed therein, so the incident light is reflected by mirrors. In this case, mirrors installed in the AMA devices 13, 15 and 17 are tilted according to the deformation of active layers formed under mirrors. The light reflected by the AMA devices 13, 15 and 17 pass a second lens 19 and a second slit 21 and form a picture on a screen (not shown) by using projection lens 23.

In most cases, ZnO is used as the active layer. However, lead zirconate titanate (PZT:Pb(Zr,Ti)O$_3$) has a better piezoelectric property than ZnO. PZT is a complete solid solution of lead zirconate (PbZrO$_3$) and lead titanate (PbTiO$_3$). PZT having a cubic structure exists in a para-electric phase at a high temperature. Orthorhombic structure PZT exists in an antiferroelectric phase, rhombohedral structure PZT exists in a ferroelectric phase, and tetragonal structure PZT exists in a ferromagnetic phase according to the composition ratio of Zr and Ti at a room temperature. A morphotropic phase boundary (MPB) of the tetragonal phase and the rhombohedral phase exists as a composition which includes Zr:Ti at a ratio of 1:1. PZT has a maximum dielectric property and a maximum piezoelectric property at the MPB. The MPB exists in a wide region in which the tetragonal phase and the rhombohedral phase coexist, but does not exists at a certain composition. Researchers do not agree about the composition of the phase coexistent region of PZT. Various theories such as thermodynamic stability, compositional fluctuation, and internal stress have been suggested as the reason for the phase coexistent region. Nowadays, a PZT thin film is manufactured by various processes such as spin coating method, organometallic chemical vapor deposition (OMCVD) method, and sputtering method.

The AMA is generally divided into bulk type AMA and thin film type AMA. The bulk type AMA is disclosed in U.S. Pat. No. 5,469,302 (issued to Dae-Young Lim). In the bulk type AMA, after a ceramic wafer which is composed of multilayer ceramics inserted into metal electrodes therein, is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA which is manufactured by using semiconductor technology, has been developed.

The thin film AMA is disclosed at U.S. Pat. No. 5,661,611, entitled "THIN FILM ACTUATED MIRROR ARRAY AND METHOD FOR THE MANUFACTURE THEREOF".

FIG. 2 shows a cross sectional view of the thin film AMA. Referring to FIG. 2, the thin film AMA has an active matrix 30, an actuator 50 formed on the active matrix 30, and a mirror 53 formed on the actuator 50. The active matrix 30 has a substrate 33, M×N (M, N are integers) number of transistors (not shown) which are installed in the substrate 33, and M×N (M, N are integers) number of connecting terminals 35 respectively formed on the transistors.

The actuator 50 has a supporting member 39 formed on the active matrix 30 which includes connecting terminal 35, a second electrode 41 having a bottom of a first portion thereof attached to the supporting member 39 and having a second portion parallelly formed about the active matrix 30, a conduit 37 formed in the supporting member 39 so as to connect connecting terminal 35 to the second electrode 41, an active layer 43 formed on the second electrode 41, and a first electrode 47 formed on the active layer 43.

The mirror 53 is installed on the first electrode 47, to reflect incident light from a light source (not shown).

A manufacturing method of the thin film AMA will be described below. FIG. 3A to FIG. 3C illustrate manufacturing steps of the thin film AMA. In FIG. 3A to FIG. 3C, the same reference numbers are used for the same elements in FIG. 2.

Referring to FIG. 3A, at first, the active matrix 30 which includes the substrate 33 in which M×N number of transistors (not shown) are formed and M×N number of connecting terminals 35 respectively formed on the transistors, is provided. Subsequently, after a sacrificial layer 55 is formed on the active matrix 30, the sacrificial layer 55 is patterned in order to expose a portion of the active matrix 30 where connecting terminal 35 is formed. The sacrificial layer 55 can be removed by using chemicals or by an etching method.

Referring to FIG. 3B, the supporting member 39 is formed on the exposed portion of the active matrix 30 by a sputtering method or a chemical vapor deposition (CVD) method. Next, after a hole is formed through supporting member 39, the conduit 37 is formed in supporting member 39 by filling the hole with an electrically conductive material, for example tungsten (W). The conduit 37 electrically connects the connecting terminal 35 to the second electrode 41 which is successively formed. The second electrode 41 is formed on the supporting member 39 and on the sacrificial layer 55 by using an electrically conductive material such as gold (Au) or silver (Ag). The active layer 43 is formed on the second electrode 41 by using a piezoelectric material, for example lead zirconate titanate (PZT). The first electrode 47 is formed on the active layer 43 by using an electrically conductive material such as gold (Au) or silver (Ag).

The transistor installed in the active matrix 30 converts a picture signal which is caused by the incident light from the light source, into a picture signal current. The picture signal current is applied to the second electrode 41 through the connecting terminal 35 and the conduit 37. At the same time, a bias current from a common line (not shown) formed on the bottom of the active matrix 30, is applied to the first electrode 47, so an electric field is generated between the first electrode 47 and the second electrode 41. The active layer 43 formed between the first electrode 47 and the second electrode 41 tilts by the electric field.

The mirror 53 is formed on the first electrode 47. The mirror reflects the incident light from the light source.

Referring to FIG. 3C, the mirror 53, the first electrode 47, the active layer 43 and the second electrode 41 are patterned one after another so that M×N number of pixels having predetermined shapes are formed. Consequently, after the sacrificial layer 55 is removed by etching, pixels are rinsed and dried in order to complete the thin film AMA.

However, in the above-described thin film AMA, the amount of the light reflected by the mirror is smaller than the amount of the incident light onto the mirror considering the area of the thin film AMA and the tilting angle of the mirror is small, so the quality of picture projected on to the screen is decreased because only a portion of the mirror is tilted in order to reflect the incident light. In addition, a sufficient bias current for generating the electric field may not be applied to the top electrode because the common line for applying the bias current is much thin so that a voltage drop is generated in the common line due to the internal resistance of the common line. Thereby, the tilting angle is lower because a sufficient electric field may not generated between the top electrode and the bottom electrode. Furthermore, the transistor installed in the active matrix is damaged during forming the actuator because the actuator is exactly formed on the transistor.

SUMMARY OF THE INVENTION

Accordingly, considering the conventional problems as described above, it is a first object of the present invention to provide a thin film actuated mirror array in an optical projection system having a thick common line formed on a first portion of an actuator which is formed on a portion of a substrate adjacent to a portion in which an electrical wiring is installed, and a reflecting member formed by using a second sacrificial layer, so a voltage drop in the common line and a damage of the electrical wiring can be prevented and a flatness of the reflecting member and a quality of a picture projected onto a screen are increased.

Also, it is a second object of the present invention to provide a method for manufacturing the above thin film actuated mirror array in an optical projection system.

To accomplish the above first object, there is provided in the present invention a thin film actuated mirror array in an optical projection system which is actuated by a first signal and a second signal has a substrate, an actuator, a common line, and a reflecting member.

The substrate has an electrical wiring and a connecting terminal for receiving a first signal from outside and transmitting the first signal. The actuator has a supporting layer formed on the substrate, a bottom electrode is formed on the supporting layer for receiving the first signal, a top electrode corresponding to the bottom electrode for receiving the second signal and generating an electric field between the top electrode and the bottom electrode, and an active layer formed between the top electrode and the bottom electrode and deformed by the electric field. The common line applies the second signal to the top electrode. The common line is formed on a portion of the actuator and connected to the top electrode. The reflecting member is formed on the top electrode for reflecting a light.

The bottom electrode, the active layer, and the top electrode respectively have a rectangular shape. The bottom electrode is formed on a central portion of the supporting layer. The active layer is smaller than the bottom electrode and the top electrode is smaller than the active layer.

The actuator further has a via contact for transmitting the first signal from the connecting terminal to the bottom electrode and a connecting member for connecting the via contact to the bottom electrode. The via contact is formed in a via hole which is formed from a portion of the supporting layer to the connecting terminal and the connecting member is formed from the via contact to the bottom electrode.

Preferably, the via contact and the connecting member are composed of an electrically conductive metal such as platinum, tantalum, or platinum-tantalum, the supporting layer is composed of a rigid material, the bottom electrode is composed of an electrically conductive metal, the active layer is composed of a piezoelectric material or an electrostrictive material, the top electrode is composed of an electrically conductive metal, and the common line is composed of an electrically conductive metal such as platinum, tantalum, platinum-tantalum, aluminum, or silver to have a thickness of between 0.5 $\mu$m and 2.0 $\mu$m.

The top electrode further has a post for supporting the reflecting member. The post is formed between a portion of the top electrode and the reflecting member and the reflecting member has a rectangular plate shape. The reflecting member is composed of a reflective metal.

In order to accomplish the above second object, there is provided in the present invention a method for manufacturing a thin film actuated mirror array being actuated by a first signal and a second signal. According to the method of the present invention, a substrate having an electrical wiring and a connecting terminal for receiving the first signal from outside and transmitting the first signal is provided. Then, a first layer on the substrate is formed. A bottom electrode layer is formed on the first layer and the bottom electrode layer is patterned to form a bottom electrode for receiving the first signal. A second layer and a top electrode layer are formed on the first layer and on the bottom electrode. An actuator is formed by patterning the top electrode layer to form a top electrode for receiving the second signal and generating an electric field, by patterning the second layer to form an active layer deformed by the electric field, and by patterning the first layer to form a supporting layer beneath the bottom electrode. Then, a common line connected to the top electrode is formed on a portion of the actuator and then a reflecting member for reflecting a light is formed on the actuator.

The step of forming the first layer is performed by a low pressure chemical vapor deposition method by using a nitride or a metal, the steps of forming the bottom electrode layer and the top electrode layer are performed by a sputtering method or a chemical vapor deposition method by using an electrically conductive metal, and the step of forming the second layer is performed by a sol-gel method, a sputtering method, or a chemical vapor deposition method by using a piezoelectric material or an electrostrictive material.

The step of forming the second layer further has annealing the second layer by a rapid thermal annealing method and polling the second layer.

Preferably, the step of forming the actuator further has forming a via hole from a portion of the active layer to the connecting terminal through the bottom electrode and the first layer, forming a via contact in the via hole, and forming a connecting member for connecting the via contact to the bottom electrode. For example, the step of forming the via contact and the connecting member are performed by a sputtering method or a chemical vapor deposition method by using an electrically conductive metal and the step of forming the common line is performed by a sputtering method or a chemical deposition method by using platinum, tantalum, platinum-tantalum, aluminum, or silver.

The step of forming the reflecting member is performed after forming a sacrificial layer on the actuator and patterning the sacrificial layer to expose a portion of the top electrode, and the step of forming the reflecting member is performed by a sputtering method or a chemical vapor deposition method by using a reflective metal.

In the thin film AMA according to the present invention, the second signal (a bias current signal) is applied to the top electrode via a pad of TCP, a panel pad of AMA, and the common line. At the same time, the first signal (a picture current signal) is applied to the bottom electrode via the pad of TCP, the panel pad of AMA, the electrical wiring, the connecting terminal, the via contact, and the connecting member. Thereby, an electric field is generated between the top electrode and the bottom electrode. The active layer formed between the top electrode and the bottom electrode is deformed by the electric field. The active layer is deformed in the direction perpendicular to the electric field. The active layer actuates in the direction opponent to the supporting layer. That is, the actuator having the active layer actuates upward by a predetermined tilting angle.

The reflecting member for reflecting the incident light from a light source is tilted with the actuator because the reflecting member is supported by the post and is formed on the actuator. Hence, the reflecting member reflects the light onto the screen, so the picture is projected onto the screen.

Therefore, in the thin film AMA according to the present invention, the electrical wiring and the connecting terminal which are formed on the substrate may not be damaged because the actuator is formed on a portion of the substrate which is adjacent to the portion where the electrical wiring and the connecting terminal are formed. In addition, the voltage drop of the second signal can be minimized because the common line is formed thickly on a portion of the actuator, so a sufficient second signal is applied to the top electrode. Thereby, a sufficient electric field is generated between the top electrode and the bottom electrode. Furthermore, the flatness of the reflecting member may be enhanced because the reflecting member is formed on the second sacrificial layer after the second sacrificial layer is formed on the actuator and the reflecting member is supported by the post.

BRIEF DESCRIPTION OF THE DRAWINGS

The above objects and advantages of the present invention will become more apparent by describing in detail preferred embodiments thereof with reference to the attached drawings, in which:

FIG. 2 is a cross sectional view for showing a thin film actuated mirror array disclosed in a prior application of the assignee of this application;

FIG. 3A to FIG. 3C illustrate manufacturing steps of the thin film actuated mirror array in FIG. 2;

DETAILED DESCRIPTION OF THE INVENTION

Hereinafter, the preferred embodiments of the present invention will be explained in more detail with reference to the accompanying drawings.

EMBODIMENT 1

Figure 1:
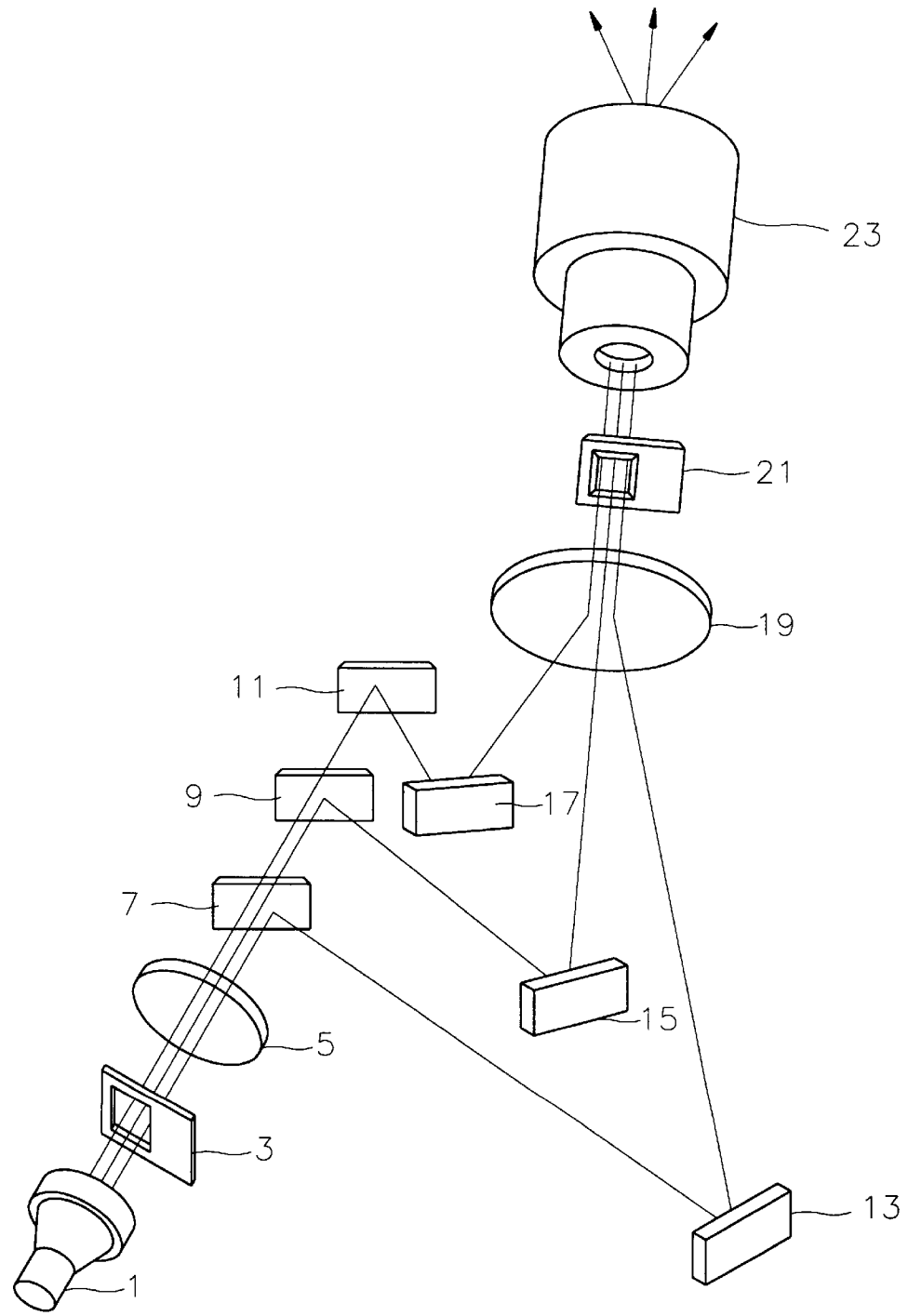
FIG. 1 is a schematic view for showing an engine system of a conventional actuated mirror array.
Figure 3A:
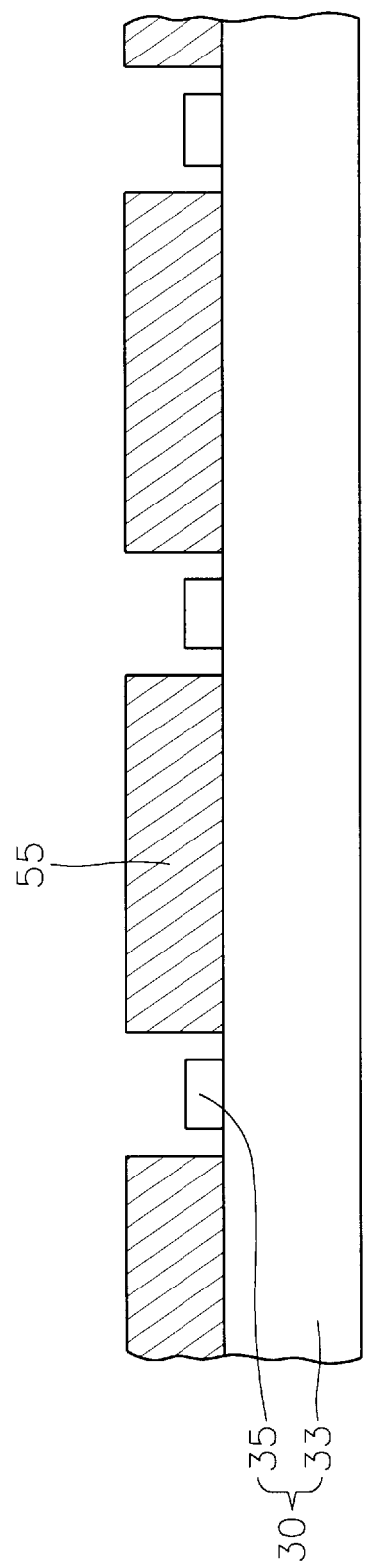
Figure 3C:
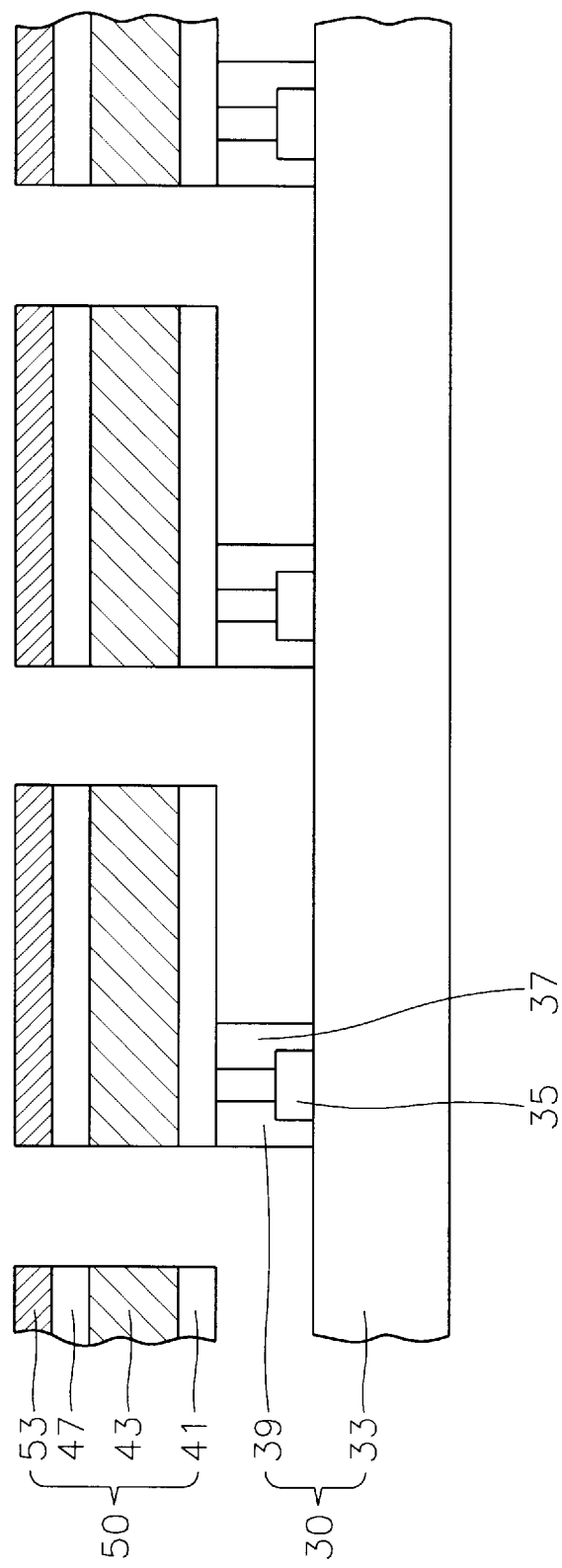
Figure 4:
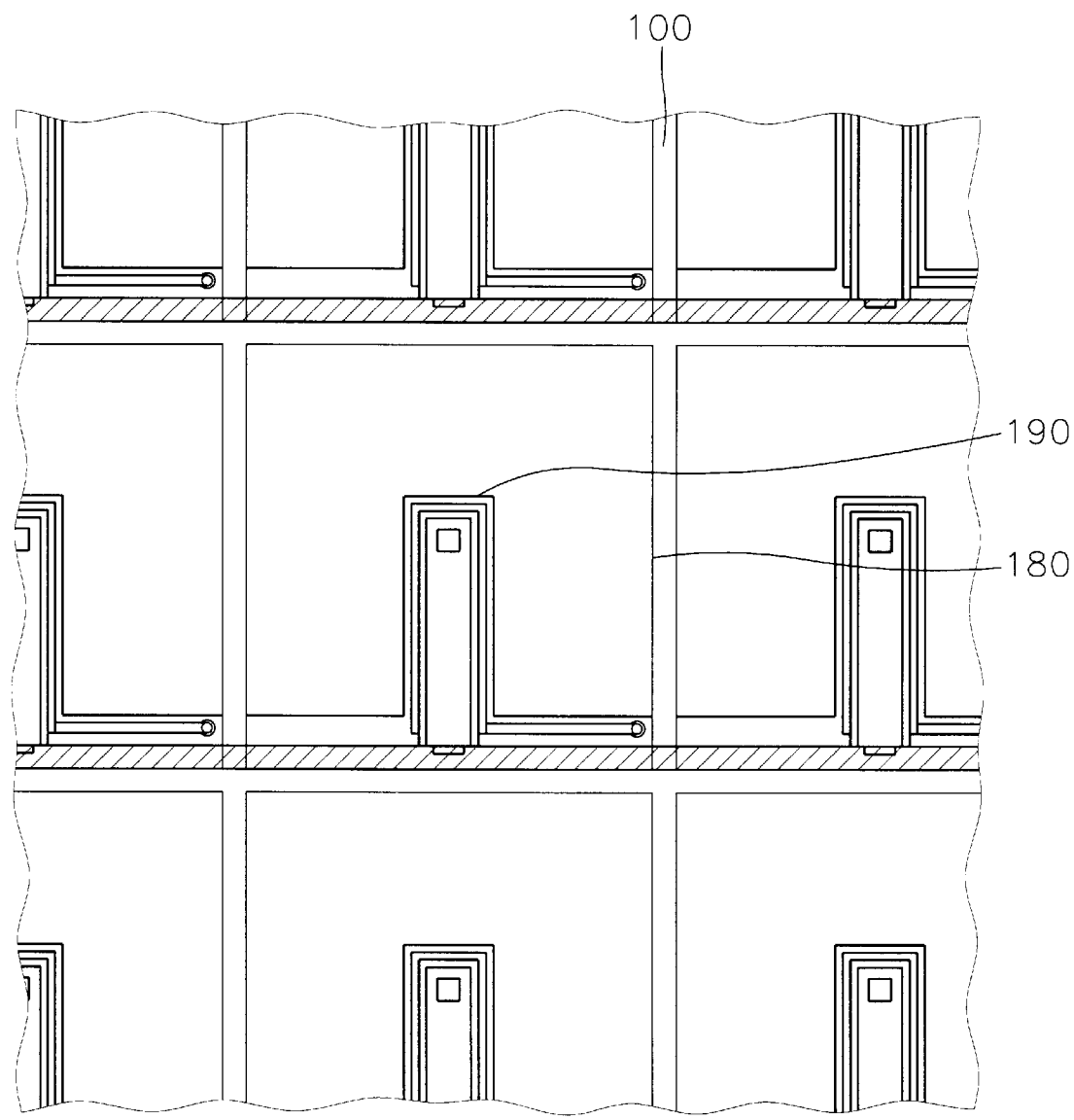
FIG. 4 is a plan view for showing a thin film actuated mirror array in an optical projection system according to a first embodiment of the present invention.
Figure 5:
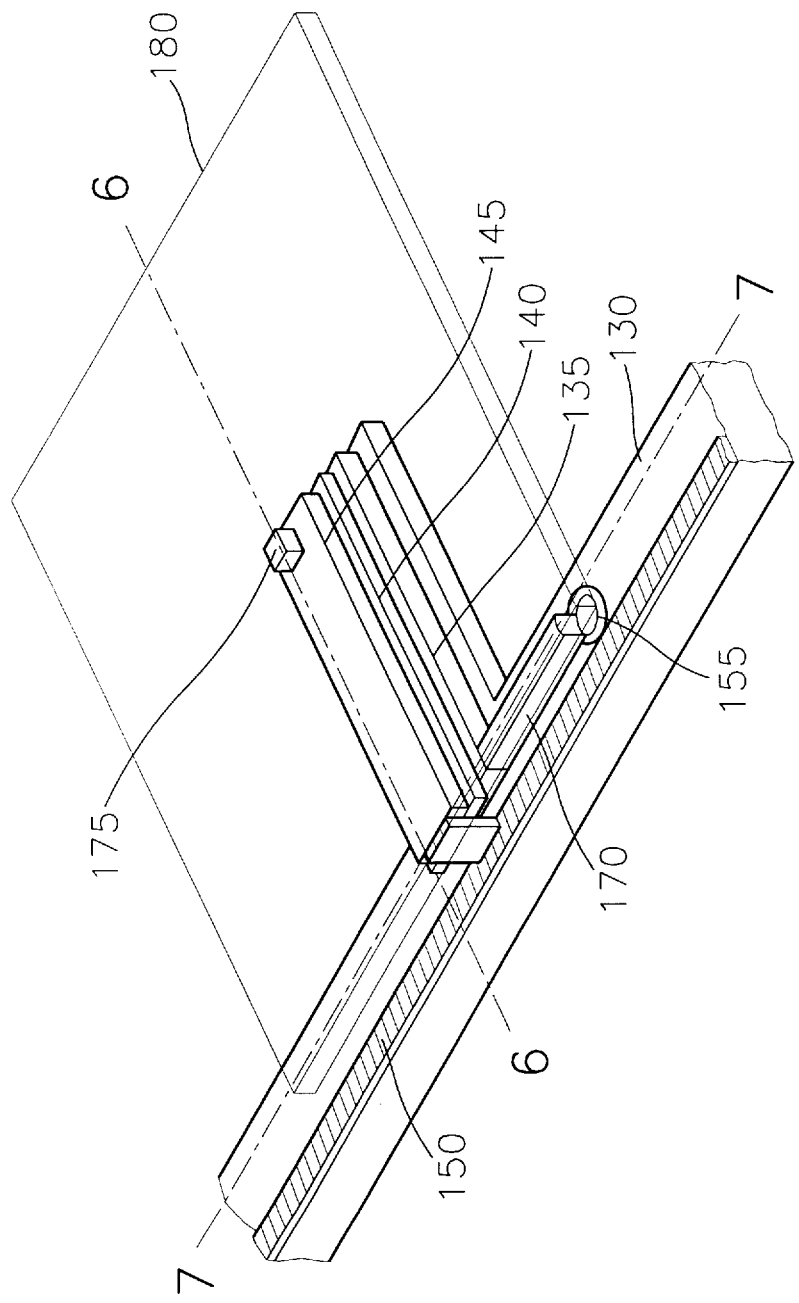
FIG. 5 is a perspective view for showing the thin film actuated mirror array in FIG. 4.
Figure 6:
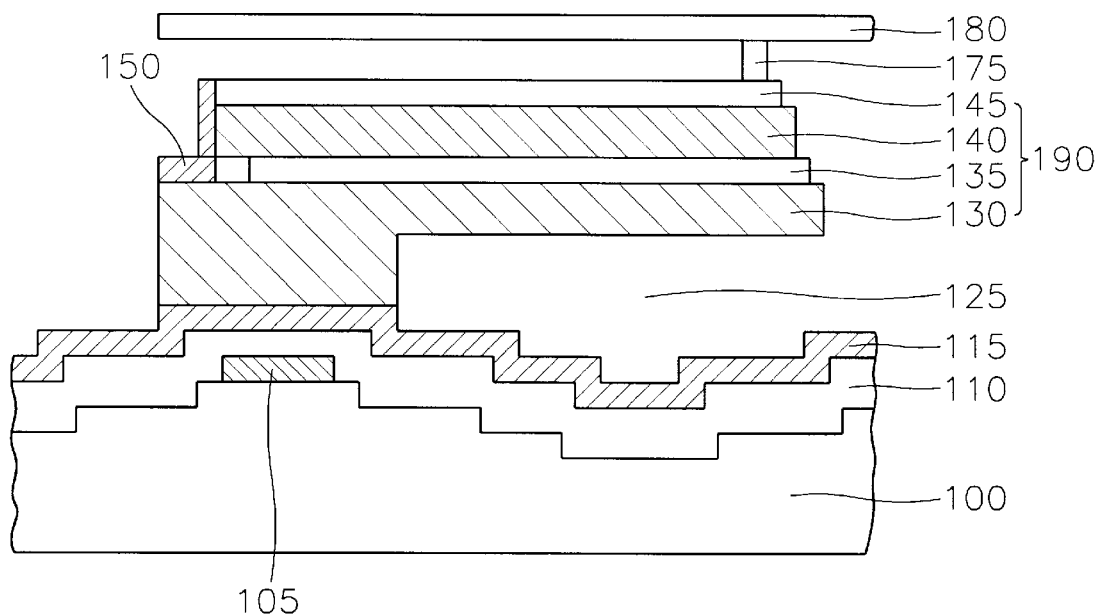
FIG. 6 is a cross sectional view taken along line 6—6 of FIG. 5.
Figure 7:
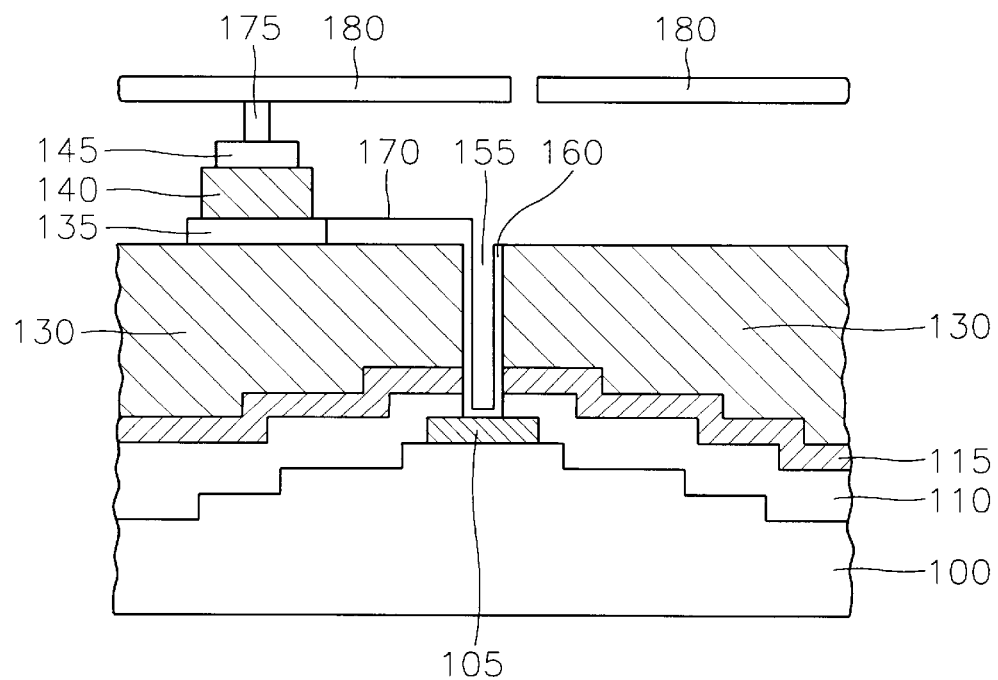
FIG. 7 is a cross sectional view taken along line 7—7 of FIG. 5.

FIG. 4 is a plan view for showing thin film actuated mirror array in an optical projection system according to a first embodiment of the present invention, FIG. 5 is a perspective view for showing the thin film actuated mirror array in FIG. 4, FIG. 6 is a cross sectional view taken along line 6—6 of FIG. 5, and FIG. 7 is a cross sectional view taken along line 7—7 of FIG. 5.

Referring to FIGS. 4 and 5, the thin film AMA in an optical projection system according to the present embodiment has a substrate 100, an actuator 190 formed on the substrate 100, and a reflecting member 180 installed on the actuator 190.

Referring to FIG. 6, the substrate 100 has an electrical wiring (not shown), a connecting terminal 105 formed on the electrical wiring, a passivation layer 110 formed on the substrate 100 and on the connecting terminal 105, and an etch stop layer 115 formed on the passivation layer 110. The electrical wiring and the connecting terminal 105 receive a first signal from outside and transmit the first signal. Preferably, the electrical wiring has a metal oxide semiconductor (MOS) transistor for switching operation. The passivation layer 110 protects the substrate 100 having the electrical wiring and the connecting terminal 105. The etch stop layer 115 prevents the passivation layer 110 and the substrate 100 from etching during subsequent etching steps.

The actuator 190 has a supporting layer 130 having a first portion attached to a portion of the etch stop layer 115 under which the connecting terminal 105 is formed and a second portion formed parallel to the etch stop layer 115, a bottom electrode 135 formed on the supporting layer 130, an active layer 140 formed on the bottom electrode 135, a top electrode 145 formed on the active layer 140, a common line 150 formed on the first portion of the supporting layer 130, and a post 175 formed on a portion of the top electrode 145. An air gap 125 is interposed between the etch stop layer 115 and the second portion of the supporting layer 130. The common line 150 is connected to the top electrode 145. The reflecting member 180 is supported by the post 175 so that the reflecting member 180 is formed parallel to the top electrode 145.

Referring to FIG. 7, the actuator 190 has a via contact 160 formed in a via hole 155 and a connecting member 170 formed from the via contact 160 to the bottom electrode 135. The via hole 155 is formed from a portion of the first portion of the supporting layer 130 to the connecting terminal 105. The bottom electrode 135 is connected to the via contact 160 via the connecting member 170. Therefore, the first signal, that is a picture current signal, is applied to the bottom electrode 135 from outside through the electrical wiring, the connecting terminal 105, the via contact 160, and the connecting member 170. At the same time, when a second signal, that is a bias current signal, is applied to the top electrode 145 from outside through the common line 150, an electric field is generated between the top electrode 145 and the bottom electrode 135. Thus, the active layer 140 formed between the top electrode 145 and the bottom electrode 135 is deformed by the electric field.

Preferably, the supporting layer 130 has a T-shape and the bottom electrode 135 has a rectangular shape. The bottom electrode 135 is formed on a central portion of the supporting layer 130. The active layer 140 has a rectangular shape and is smaller than the bottom electrode 135 and the top electrode 145 has a rectangular shape and is smaller than the active layer 140.

A method for manufacturing the thin film AMA in an optical projection system according to the first embodiment of the present invention will be described as follows.

Figure 8A:
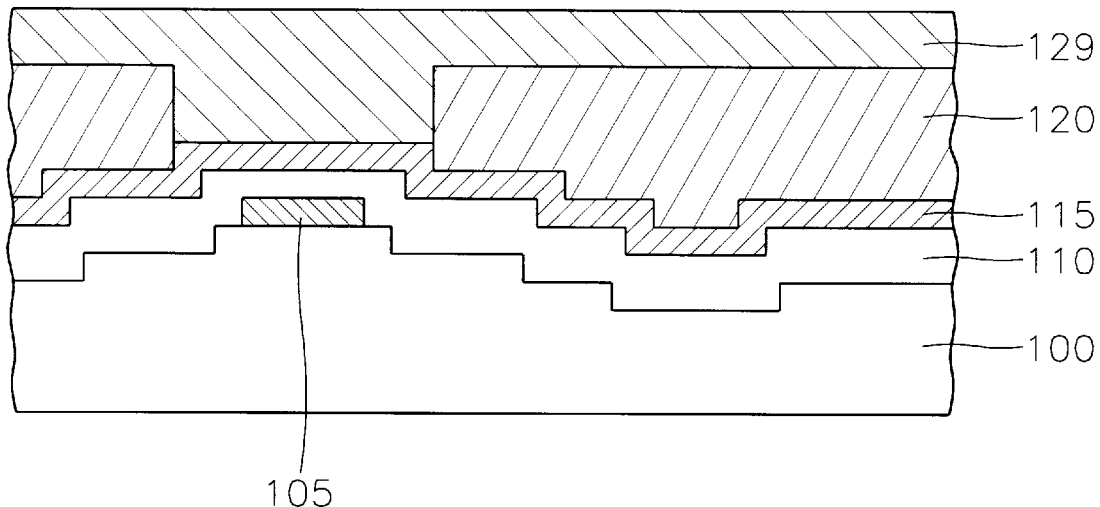
FIGS. 8A to 11B illustrate manufacturing steps of the thin film actuated mirror array in an optical projection system according to the first embodiment of the present invention.
Figure 8B:
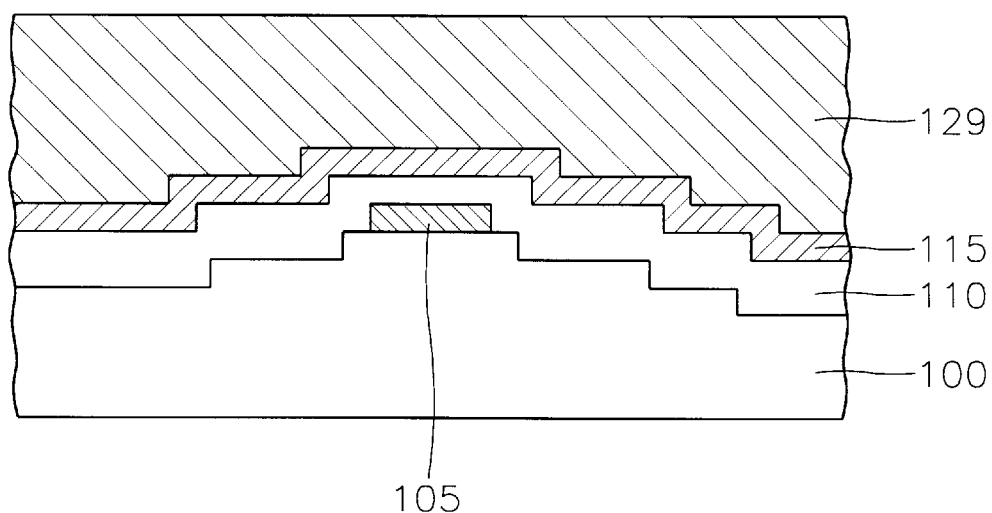

FIGS. 8A and 8B illustrate a state in which a first layer 129 is formed.

Referring to FIGS. 8A and 8B, the substrate 100 having the electrical wiring (not shown) and the connecting terminal 105 is provided. Preferably, the substrate 100 is composed of a semiconductor such as silicon (Si). The connecting terminal 105 is formed by using a metal, for example tungsten (W). The connecting terminal 105 is connected to the electrical wiring. The electrical wiring and the connecting terminal 105 receive the first signal (the picture current signal) and transmit the first signal to the bottom electrode 135. Preferably, the electrical wiring has an MOS transistor for switching operation.

The passivation layer 110 is formed on the substrate 100 having the electrical wiring and the connecting terminal 105. The passivation layer 110 is formed by using phosphor-silicate glass (PSG). The passivation layer 110 is formed by a chemical vapor deposition (CVD) method so that the passivation layer 110 has a thickness of between about 0.1 μm and 1.0 μm. The passivation layer 110 protects the substrate 100 including the electrical wiring and the connecting terminal 105 during subsequent manufacturing steps.

The etch stop layer 115 is formed on the passivation layer 110 by using nitride so that the etch stop layer 115 has a thickness of between about 1000 Å and 2000 Å. The etch stop layer 115 is formed by a low pressure chemical vapor deposition (LPCVD) method. The etch stop layer 115 protects the passivation layer 110 and the substrate 100 during subsequent etching steps.

A first sacrificial layer 120 is formed on the etch stop layer 115 by using PSG so that the first sacrificial layer 120 has a thickness of between about 0.5 μm and 2.0 μm. The first sacrificial layer 120 enables the actuator 190 to form easily. The first sacrificial layer 120 is removed by using a hydrogen fluoride vapor when the actuator 190 is completely formed. The first sacrificial layer 120 is formed by an atmospheric pressure CVD (APCVD) method. In this case, the degree of flatness of the first sacrificial layer 120 is poor because the first sacrificial layer 120 covers the top of the substrate 100 having the electrical wiring and the connecting terminal 105. Therefore, the surface of the first sacrificial layer 120 is planarized by using a spin on glass (SOG) or by a chemical mechanical polishing (CMP) method. Preferably, the surface of the first sacrificial layer 120 is planarized by CMP method.

After a portion of the first sacrificial layer 120 having the connecting terminal 105 formed thereunder is patterned along the column direction in order to expose a portion of the etch stop layer 115, a first layer 129 is formed on the exposed portion of the etch stop layer 115 and on the first sacrificial layer 120. The first layer 129 is formed by using a rigid material, for example a nitride or a metal so that the first layer 129 has a thickness of between about 0.1 μm and 1.0 μm. When the first layer 129 is formed by an LPCVD method, the ratio of nitride gas is adjusted according to the reaction time so as to release the stress in the first layer 129. The first layer 129 will be patterned to form the supporting layer 130.

Figure 9A:
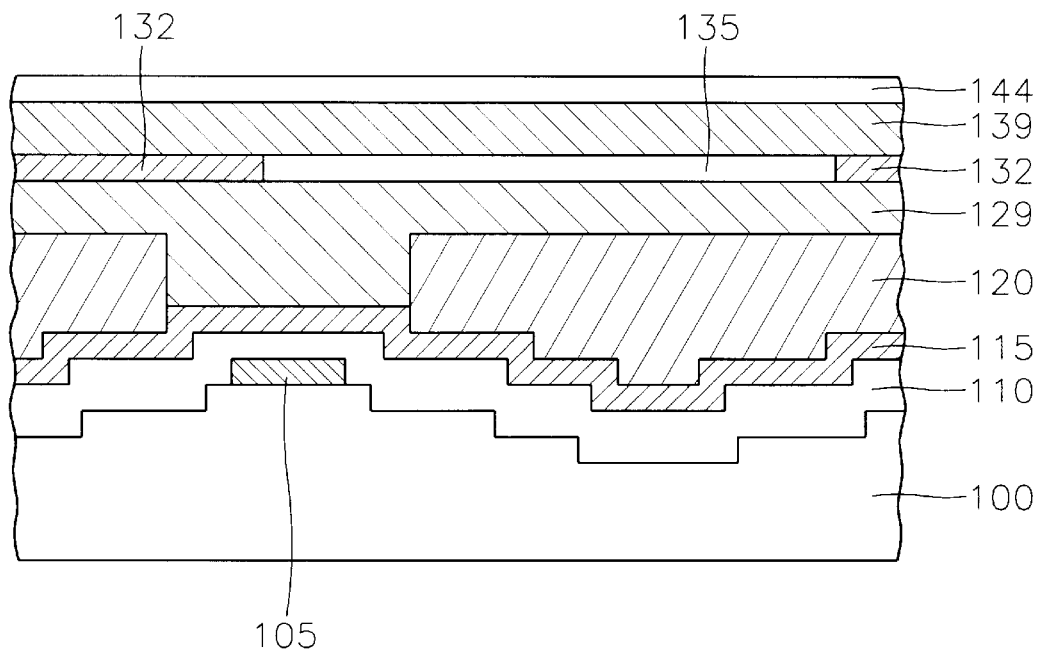
Figure 9B:
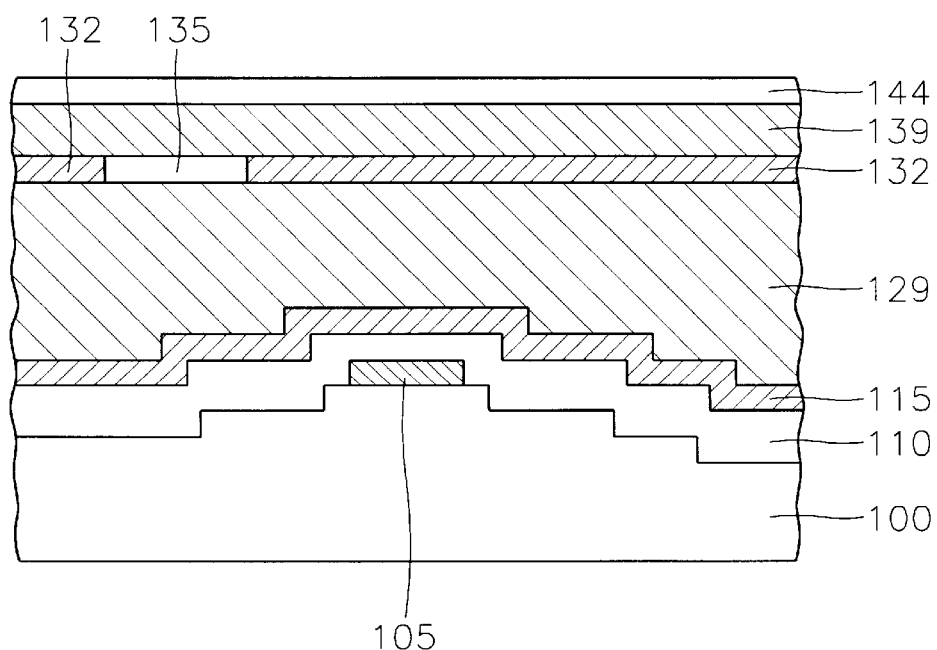

FIGS. 9A and 9B illustrate a state in which a top electrode layer 144 is formed.

Referring, to FIGS. 9A and 9B, after a first photo-resist layer 132 is formed on the first layer 129 by a spin coating method, the first photo-resist 132 is patterned so as to expose a portion of the first layer 129 along the horizontal direction. As a result, a rectangular portion of first layer 129 which is adjacent to the connecting terminal 105 is exposed. After a bottom electrode layer is formed on the exposed portion of the first layer 129 and on the first photo-resist layer 132 by a sputtering method, the bottom electrode layer is patterned to form the bottom electrode 135 on the exposed portion of the first layer 129 considering the position on which the common line 150 will be formed. So, the bottom electrode 135 has a rectangular shape. The bottom electrode 135 is formed by using an electrically conductive metal such as platinum (Pt), tantalum (Ta), or platinum-tantalum (Pt-Ta) so that the bottom electrode 135 has a thickness of between about 0.1 μm and 1.0 μm.

A second layer 139 is formed on the bottom electrode 135 and on the first photo-resist layer 132. The second layer 139 is formed by using a piezoelectric material such as PZT (Pb(Zr, Ti)O$_3$) or PLZT ((Pb, La)(Zr, Ti)O$_3$) so that the second layer 139 has a thickness of between about 0.1 μm and 1.0 μm, preferably, about 0.4 μm. Also, the second layer 139 is formed by using an electrostrictive material such as PMN (Pb(Mg, Nb)O$_3$). The second layer 139 is formed by a sol-gel method, a sputtering method, or a CVD method. Subsequently, the second layer 139 is annealed by a rapid thermal annealing (RTA) method and then the second layer 139 is polled. The second layer 139 will be patterned so as to form the active layer 140.

A top electrode layer 144 is formed on the second layer 139. The top electrode layer 144 is formed by using an electrically conductive metal such as aluminum (Al), platinum, or tantalum. The top electrode layer 144 is formed by a sputtering method or a CVD method so that the top electrode layer 144 has a thickness of between about 0.1 μm and 1.0 μm. The top electrode layer 144 will be patterned so as to form the top electrode 145.

Figure 10A:
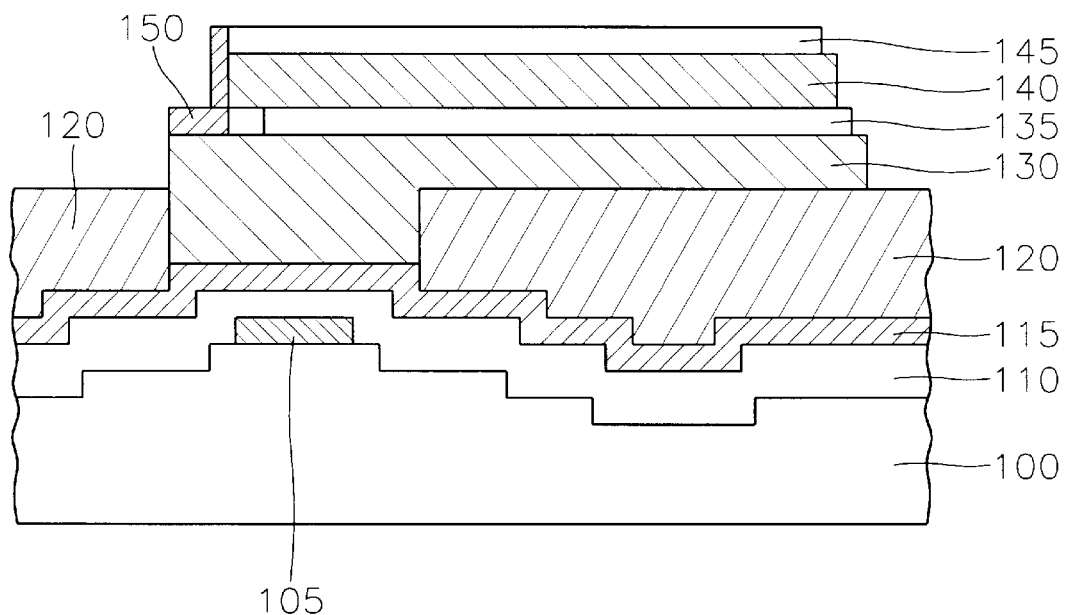
Figure 10B:
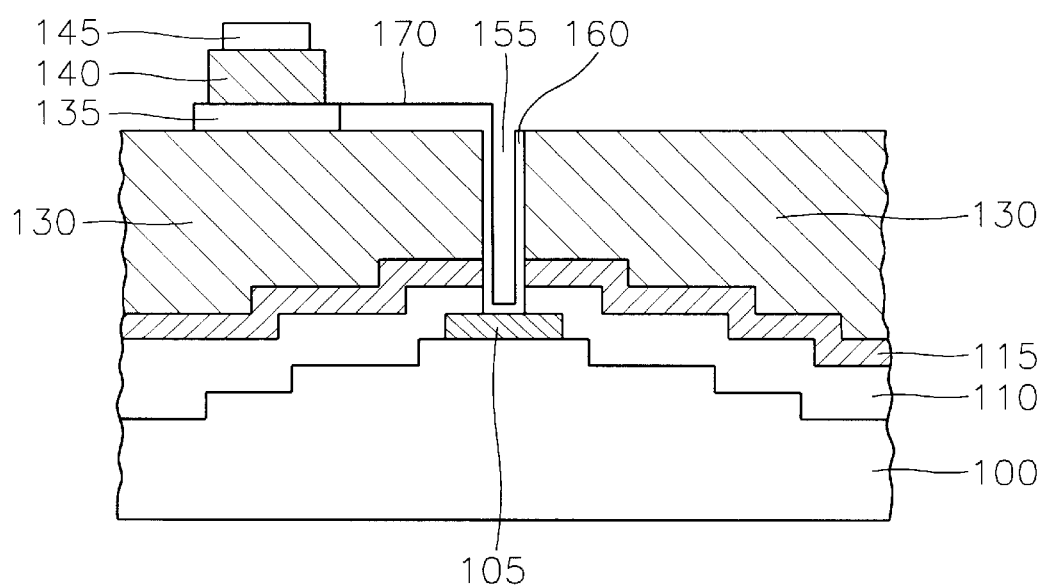

FIG. 10A illustrates a state in which the common line 150 is formed and FIG. 10B illustrates a state in which the via contact 160 is formed.

Referring to FIG. 10A, after a second photo-resist layer (not shown) is coated on the top electrode layer 144 by a spin coating method, the top electrode layer 144 is patterned so as to from the top electrode 145 having a rectangular shape by using the second photo-resist layer as an etching mask. Then, the second photo-resist layer is removed by striping. The second layer 139 is patterned by the same method as that of the top electrode layer 144. That is, after a third photo-resist layer (not shown) is coated on the top electrode 145 and on the second layer 139 by a spin coating method, the second layer 139 is patterned so as to form the active layer 140 by using the third photo-resist layer as an etching mask. The active layer 140 has a rectangular shape which is wider than that of the top electrode 145. In this case, the active layer 140 is smaller than the bottom electrode 135. Then, the third photo-resist layer is removed by striping.

The first layer 129 is patterned so as to form the supporting layer 130 by the above-described method. The supporting layer 130 has a T-shape which differs from the shape of the bottom electrode 135. The bottom electrode 135 is formed on the central portion of the supporting layer 130.

The common line 150 is formed on the first portion of the supporting layer 130 after the first photo-resist layer 132 is removed. Namely, after a fourth photo-resist layer (not shown) is coated on the supporting layer 130 by a spin coating method and then the fourth photo-resist is patterned to expose the first portion of the supporting layer 130, the common line 150 is formed on the exposed portion of the supporting layer 130 by using an electrically conductive metal such as platinum, tantalum, platinum-tantalum, or aluminum. The common line 150 is formed by a sputtering method or a CVD method so that the common line 150 has a thickness of between about 0.5 μm and 2.0 μm. At that time, the common line 150 is separated from the bottom electrode 135 by a predetermined distance and is attached to the top electrode 145 and to the active layer 140. As it is described above, a voltage drop of the second signal can be minimized when the second signal passes the common line 150 because the common line 150 has a thick thickness, so its internal resistance is decreased. Thereby, a sufficient second signal is applied to the top electrode 145 through the common line 150, so an sufficient electric field is generated between the top electrode 145 and the bottom electrode 135.

Referring to FIG. 10B, a portion of the first portion of supporting layer 130 having the connecting terminal 105 thereunder and a portion which is adjacent to the portion of the first portion of the supporting layer 130 are exposed when the fourth photo-resist is patterned. The via hole 155 is formed from the portion of the first portion of the supporting layer 130 to the connecting terminal 105 through the etch stop layer 115 and the passivation layer 110 by an etching. The via contact 160 is formed in the via hole 155 from the connecting terminal 105 to the supporting layer 130. At the same time, the connecting member 170 is formed on the portion which is adjacent to the portion of the first portion of the supporting layer 130 from the bottom electrode 135 to the via contact 160. Thus, the via contact 160, the connecting member 170, and the bottom electrode 135 are connected one after another. The via contact 160 and the connecting member 170 are formed by using an electrically conductive metal such as platinum, tantalum, or platinum-tantalum. The connecting member 170 has a thickness of between about 0.5 μm and 1.0 μm. Thereby, a voltage drop of the first signal can be minimized when the first signal passes the connecting member 170 because the connecting member 170 has a thick thickness, so its internal resistance is decreased. Thereby, a sufficient first signal is applied to the bottom electrode 135 through the via contact 160 and the connecting member 170. The actuator 190 having the top electrode 145, the active layer 140, the bottom electrode 135, and the supporting layer 130, is completed after the fourth photo-resist is removed by etching.

Figure 11A:
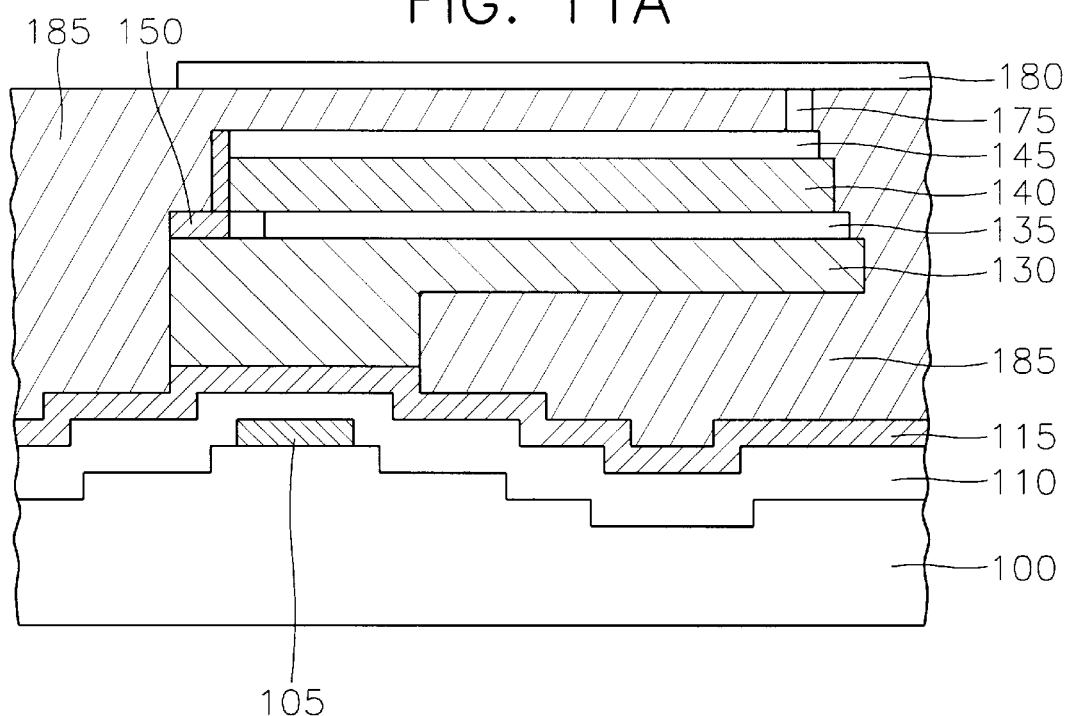
Figure 11B:
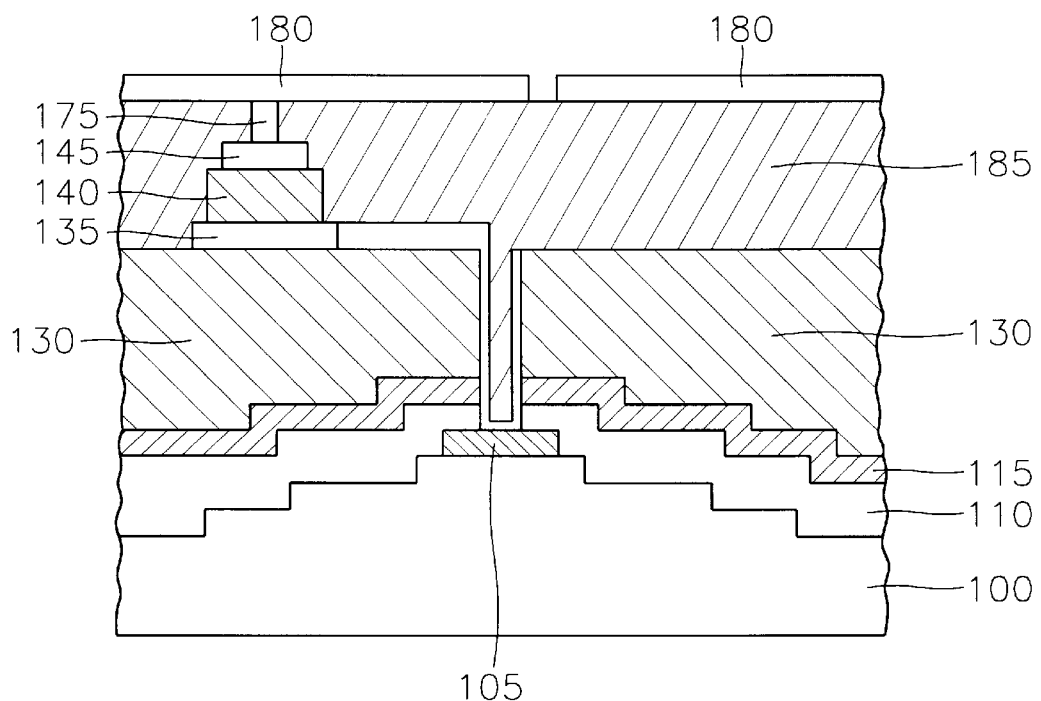

FIGS. 11A and 11B illustrate a state in which the reflecting member 180 is formed.

Referring to FIGS. 11A and 11B, after the first sacrificial layer 120 is removed by using a hydrogen fluoride vapor, a second sacrificial layer 185 is formed on the actuator 190 by using a polymer having a fluidity. The second sacrificial layer 185 is formed by a spin coating method so that the second sacrificial layer 185 covers the top electrode 145. Subsequently, the second sacrificial layer 185 is patterned to expose a portion of the top electrode 145. The post 175 is formed on the exposed portion of the top electrode 145 and the reflecting member 180 is formed on the post 175 and on the second sacrificial layer 185. The post 175 and the reflecting member 180 are simultaneously formed by using a reflective metal such as aluminum, platinum, or silver. The post 175 and the reflecting member 180 are formed by a sputtering method or a CVD method. Preferably, the reflecting member 180 for reflecting a incident light from a light source (not shown) is a mirror and has a thickness of between 0.1 μm and 1.0 μm. The reflecting member 180 has a rectangular plate shape to cover the top electrode 145. As it is described above, the flatness of the reflecting member 180 may be enhanced because the reflecting member 180 is formed on the second sacrificial layer 185. The actuator 190 which the reflecting member 180 is formed thereon is completed as shown in FIGS. 6 and 7 after the second sacrificial layer 185 is removed by etching.

An ohmic contact (not shown) is formed on the bottom of the substrate 100 by using chrome (Cr), nickel (Ni), or gold after the substrate 100 having the actuator 190 is rinsed and dried. The ohmic contact is formed by a sputtering method or an evaporation method. The substrate 100 is cut to prepare for tape carrier package (TCP) bonding in order to apply the first signal to the bottom electrode 135 and the second signal to the top electrode 145. Then, an panel pad (not shown) of the thin film AMA and a pad of TCP are connected so that the thin film AMA module is completed.

The operation of the thin film AMA in an optical projection system according to the first embodiment of the present invention will be described.

In the thin film AMA according to the present embodiment, the second signal (the bias current signal) is applied to the top electrode 145 via the pad of TCP, the panel pad of AMA, and the common line 150. At the same time, the first signal (the picture current signal) is applied to the bottom electrode 135 via the pad of TCP, the panel pad of AMA, the electrical wiring, the connecting terminal 105, the via contact 160, and the connecting member 170. Thereby, an electric field is generated between the top electrode 145 and the bottom electrode 135. The active layer 140 formed between the top electrode 145 and the bottom electrode 135 is deformed by the electric field. The active layer 140 is deformed in the direction perpendicular to the electric field. The active layer 140 actuates in the direction opponent to the supporting layer 130. That is, the actuator 190 having the active layer 140 actuates upward by a predetermined tilting angle.

The reflecting member 180 for reflecting the incident light from the light source is tilted with the actuator 190 because the reflecting member 180 is supported by the post 175 and is formed on the actuator 190. Hence, the reflecting member 180 reflects the light onto the screen, so the picture is projected onto the screen.

Therefore, in the thin film AMA according to the present embodiment, the electrical wiring and the connecting terminal 105 which are formed on the substrate 100 may not be damaged because the actuator 190 is formed on a portion of the substrate 100 which is adjacent to the portion where the electrical wiring and the connecting terminal 105 are formed. In addition, the voltage drop of the second signal can be minimized because the common line 150 is formed thickly on a portion of the actuator 190, so a sufficient second signal is applied to the top electrode 145. Thereby, a sufficient electric field is generated between the top electrode 145 and the bottom electrode 135. Furthermore, the flatness of the reflecting member 180 may be enhanced because the reflecting member 180 is formed on the second sacrificial layer 185 after the second sacrificial layer 185 is formed on the actuator 190 and the reflecting member 180 is supported by the post 175.

EMBODIMENT 2

Figure 12:
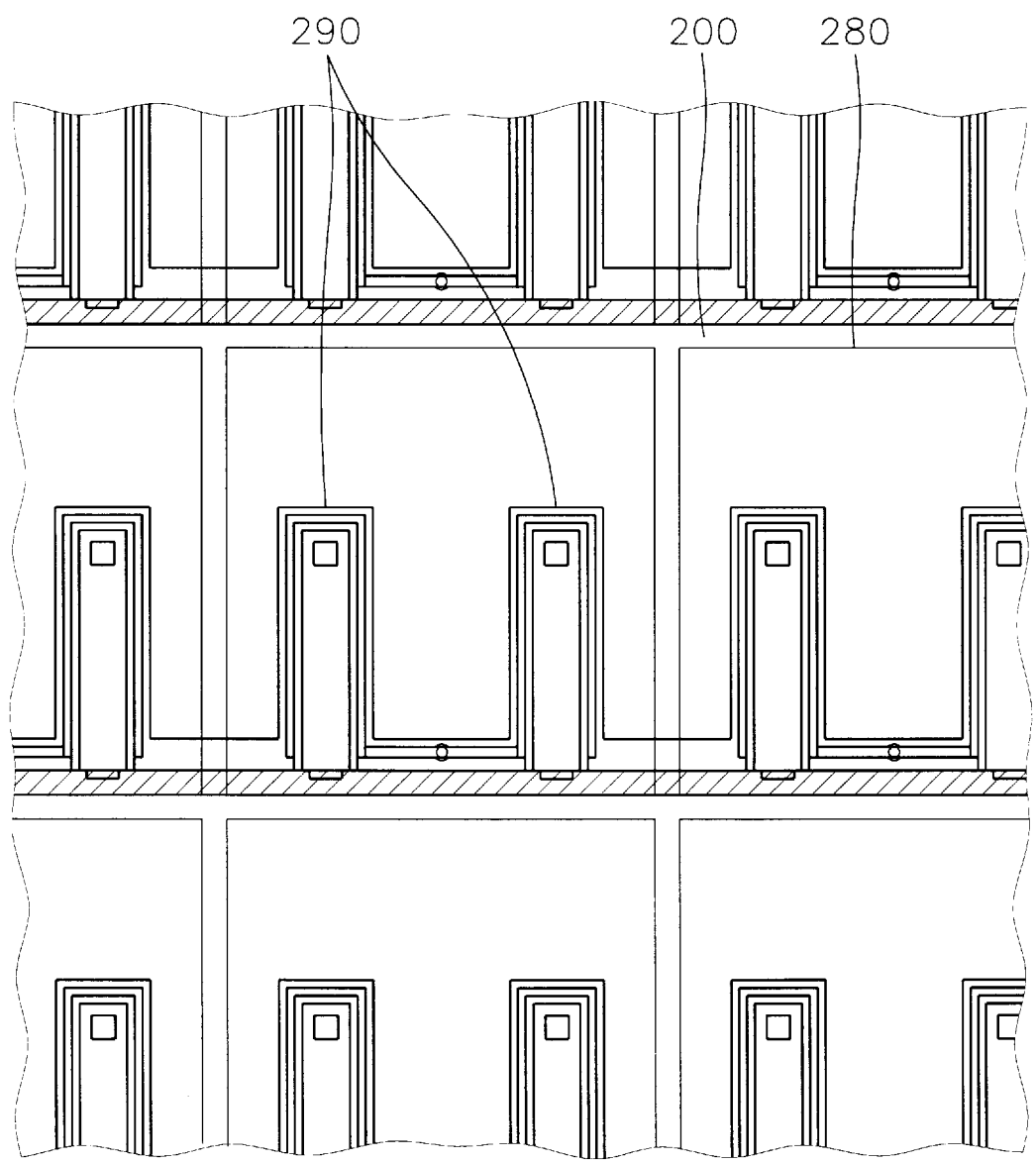
FIG. 12 is a plan view for showing a thin film actuated mirror array in an optical projection system according to a second embodiment of the present invention.
Figure 13:
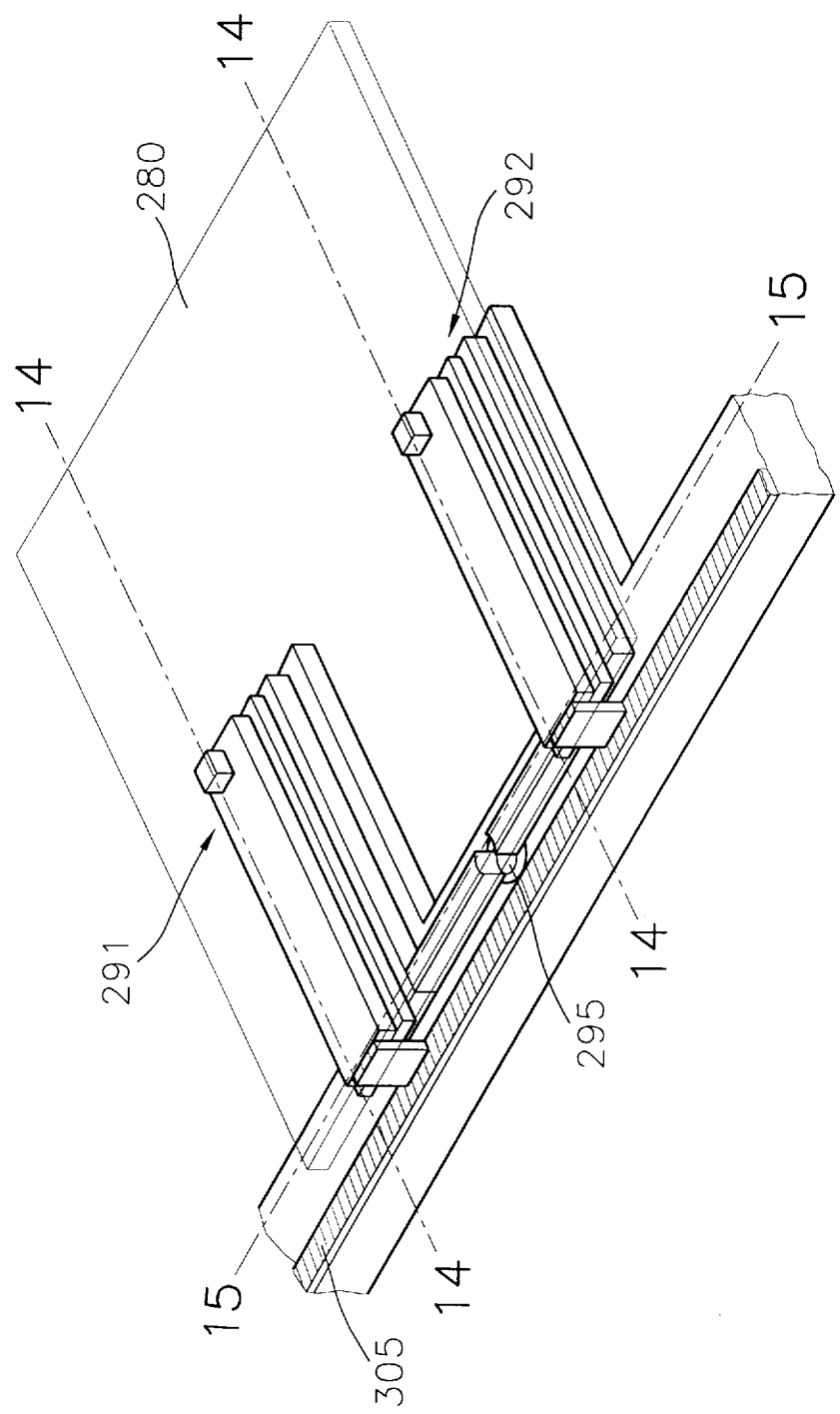
FIG. 13 is a perspective view for showing the thin film actuated mirror array in FIG. 12.
Figure 14:
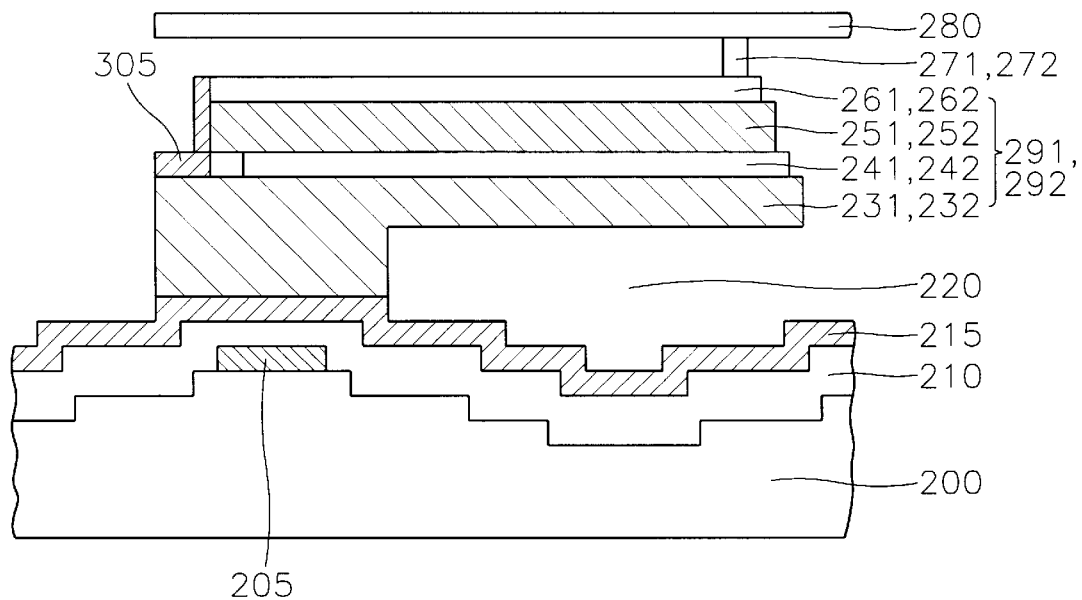
FIG. 14 is a cross sectional view taken along line 14—14 of FIG. 13.
Figure 15:
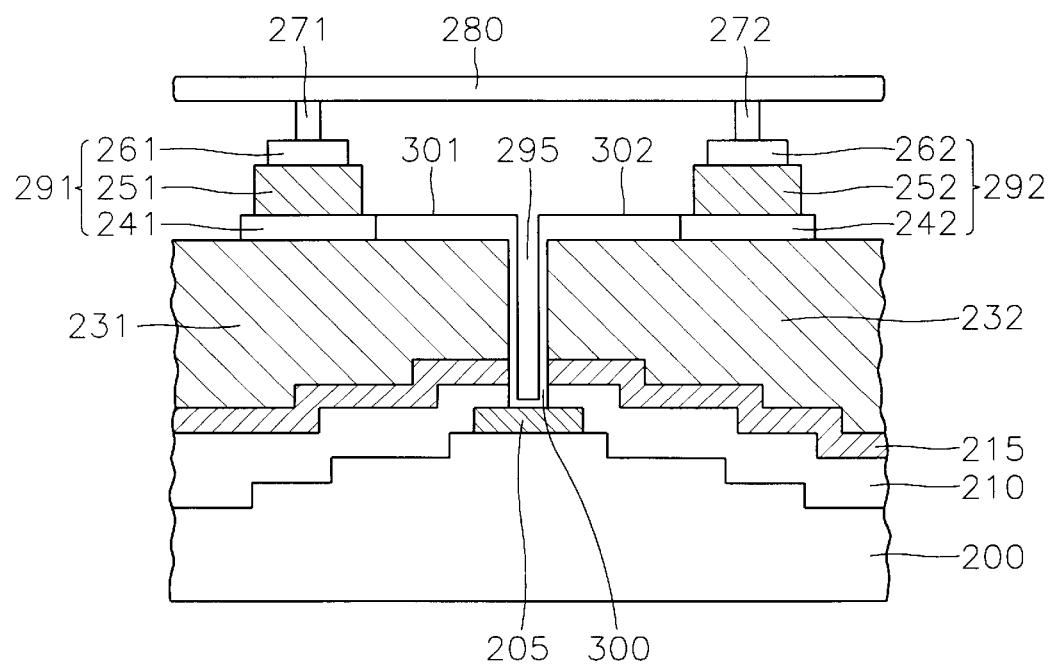
FIG. 15 is a cross sectional view taken along line 15—15 of FIG. 13.

FIG. 12 is a plan view for showing a thin film actuated mirror array in an optical projection system according to a second embodiment of the present invention, FIG. 13 is a perspective view for showing the thin film actuated mirror array in FIG. 12, FIG. 14 is a cross sectional view taken along line 14—14 of FIG. 13, and FIG. 15 is a cross sectional view taken along line 15—15 of FIG. 13.

Referring to FIGS. 12 and 13, the thin film AMA according to the present embodiment has a substrate 200, an actuator 290 formed on the substrate 200, and a reflecting member 280 installed on the actuator 290.

The actuator 290 has a first actuating portion 291 formed on a first portion of the substrate 200 and a second actuating portion 292 formed on a second portion of the substrate 200.

Referring to FIG. 14, the substrate 200 has an electrical wiring (not shown), a connecting terminal 205 formed on the electrical wiring, a passivation layer 210 formed on the connecting terminal 205 and on the electrical wiring, and an etch stop layer 215 formed on the passivation layer 210. The electrical wiring and the connecting terminal 205 receive a first signal (a picture current signal) from outside and transmit the first signal. Preferably, the electrical wiring has an MOS transistor for switching operation. The passivation layer 210 protects the substrate 200 having the electrical wiring and the connecting terminal 205. The etch stop layer 215 prevents the passivation layer 210 and the substrate 200 from etching during subsequent etching steps.

The actuator 290 has the first actuating portion 291 and the second actuating portion 292 which are formed parallel to each other. The first actuating portion 291 has a first supporting layer 231 having a first portion attached to a first portion of the etch stop layer 215 and a second portion formed parallel to the etch stop layer 215, a first bottom electrode 241 formed on a central portion of the first supporting layer 231, a first active layer 251 formed on the first bottom electrode 241, a first top electrode 261 formed on the first active layer 251, and a first post 271 formed on a portion of the first top electrode 261. An air gap 220 is interposed between the etch stop layer 215 and the second portion of the first supporting layer 231. The first active layer 251 has a rectangular shape which is larger than the first top electrode 261. The first bottom electrode 241 also has a rectangular shape which is larger than the first active layer 251.

The second actuating portion 292 has the same shape as that of the first actuating portion 291. The second actuating portion 292 has a second supporting layer 232 having a first portion attached to a second portion of the etch stop layer 215 and a second portion formed parallel to the etch stop layer 215, a second bottom electrode 242 formed on a central portion of the second supporting layer 232, a second active layer 252 formed on the second bottom electrode 242, a second top electrode 262 formed on the second active layer 252, and a second post 271 formed on a portion of the second top electrode 261. The air gap 220 is interposed between the etch stop layer 215 and the second portion of the second supporting layer 232. The second active layer 252 has a rectangular shape which is larger than the second top electrode 262. The second bottom electrode 242 also has a rectangular shape which is larger than the second active layer 252.

The first portion of the first supporting layer 231 and the first portion of the second supporting layer 232 are connected each other. Preferably, the first supporting layer 231 and the second supporting layer 232 respectively have a T-shape.

A common line 305 is formed on a first portion of the actuator 290. Namely, the common line 305 is formed on the first portion of the first supporting layer 231 and on the first portion of the second supporting layer 232. The common line 305 is connected to the first top electrode 261 and to the second top electrode 262.

The reflecting member 280 is supported by the first post 271 and by the second post 272 so that the reflecting member 280 is formed parallel to the first top electrode 261 and to the second top electrode 262.

Referring to FIG. 15, a via hole 295 is formed from a connecting portion of the first supporting layer 231 and the second supporting layer 232 to the connecting terminal 205 through the passivation layer 210 and the etch stop layer 215.

The actuator 290 has a via contact 300 formed in the via hole 295, a first connecting member 301 formed from the via contact 300 to the first bottom electrode 241, and a second connecting member 302 formed from the via contact 300 to the second bottom electrode 242. Thus, the first signal is applied to the first bottom electrode 241 from outside through the electrical wiring, the connecting terminal 205, the via contact 300, and the first connecting member 301. The first signal is also applied to the second bottom electrode 242 from outside through the electrical wiring, the connecting terminal 205, the via contact 300, and the second connecting member 302. At the same time, when the second signal is applied to the first top electrode 261 and to the second top electrode 262 from outside through the common line 305, a first electric field is generated between the first top electrode 261 and the first bottom electrode 241 and a second electric field is generated between the second top electrode 262 and the second bottom electrode 242. Thereby, the first active layer 251 formed between the first top electrode 261 and the first bottom electrode 241 is deformed by the first electric field and the second active layer 252 formed between the second top electrode 262 and the second bottom electrode 242 is also deformed by the second electric field.

A method for manufacturing the thin film AMA in an optical projection system according to the present embodiment will be described as follows.

Figure 16A:
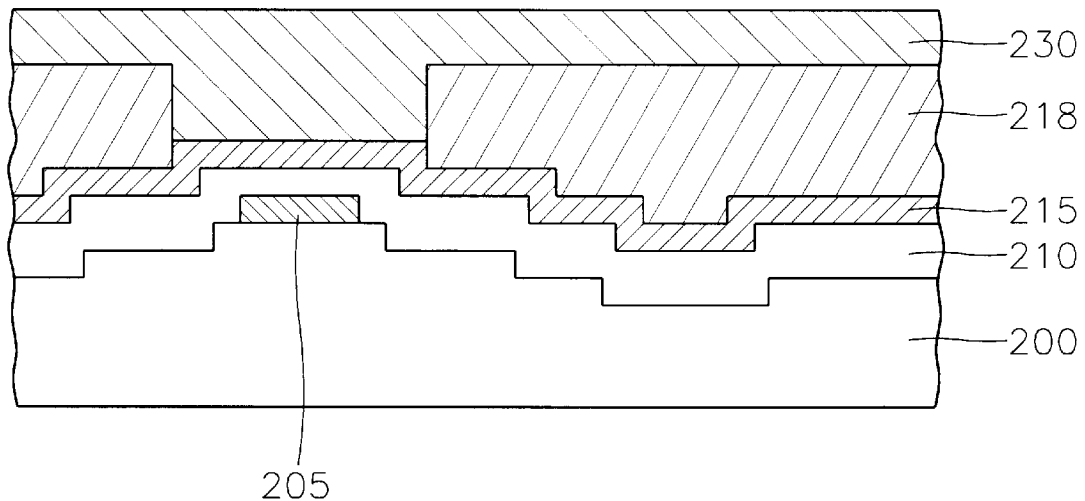
FIGS. 16A to 19B illustrate manufacturing steps of the thin film actuated mirror array in an optical projection system according to the second embodiment of the present invention.
Figure 16B:
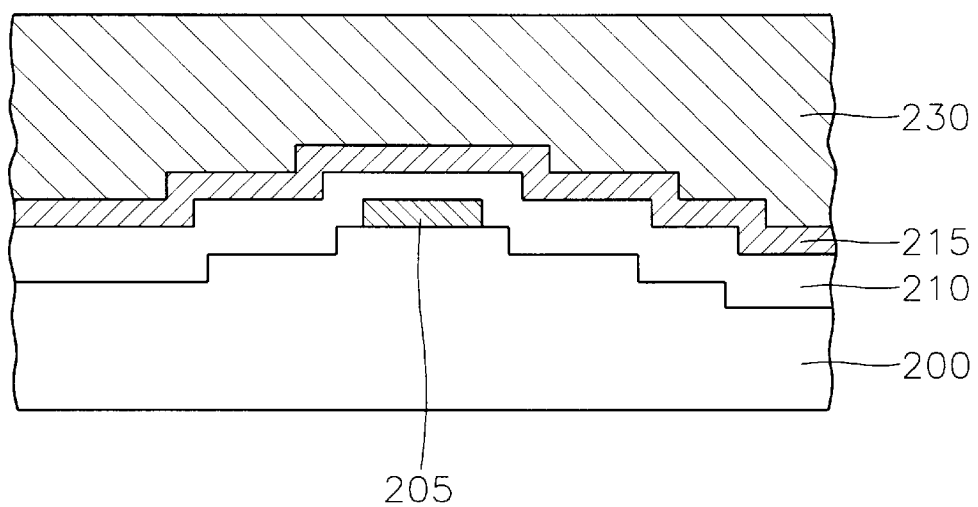

FIGS. 16A and 16B illustrate a state in which a supporting layer 230 is formed.

Referring to FIGS. 16A and 16B, the substrate 200 having the electrical wiring (not shown) and the connecting terminal 205 is provided. The electrical wiring and the connecting terminal 205 receive the first signal from outside and transmit the first signal to the first bottom electrode 241 and to the second bottom electrode 242. Preferably, the substrate 200 is composed of a semiconductor such as silicon and the electrical wiring has an MOS transistor for switching operation.

The passivation layer 210 is formed on the substrate 200 having the electrical wiring and the connecting terminal 205. The passivation layer 210 is formed by using PSG so that the passivation layer 210 has a thickness of between about 0.1 $\mu$m and 1.0 $\mu$m. The passivation layer 210 is formed by CVD method. The passivation layer 210 protects the substrate 200 having the electrical wiring and the connecting terminal 205 during subsequent manufacturing steps.

The etch stop layer 215 is formed on the passivation layer 210 by using nitride so that the etch stop layer 215 has a thickness of between about 1000 Å and 2000 Å. The etch stop layer 215 is formed by a LPCVD method. The etch stop layer 215 protects the passivation layer 210 and the substrate 200 during subsequent etching steps.

A first sacrificial layer 220 is formed on the etch stop layer 215 by using PSG so that the first sacrificial layer 220 has a thickness of between about 0.5 $\mu$m and 2.0 $\mu$m. The first sacrificial layer 220 enables the actuator 290 to form easily. The first sacrificial layer 220 is removed by using a hydrogen fluoride vapor when the actuator 290 is completely formed. The first sacrificial layer 220 is formed by an APCVD method. In this case, the degree of flatness of the first sacrificial layer 220 is poor because the first sacrificial layer 220 covers the top of the substrate 200 having the electrical wiring and the connecting terminal 205. Therefore, the surface of the first sacrificial layer 220 is planarized by using an SOG or by a CMP method. Preferably, the surface of the first sacrificial layer 220 is planarized by the CMP method.

A portion of the first sacrificial layer 220 having the connecting terminal 205 formed thereunder is patterned in order to expose a portion of the etch stop layer 115, so the etch stop layer 215 is exposed as a rectangular shape centering around the connecting terminal 205. The supporting layer 230 is formed on the exposed portion of the etch stop layer 215 and on the first sacrificial layer 220. The supporting layer 230 is formed by using a rigid material, for example a nitride or a metal so that the supporting layer 230 has a thickness of between about 0.1 $\mu$m and 1.0 $\mu$m. When the supporting layer 230 is formed by an LPCVD method, the ratio of nitride gas is adjusted according to the reaction time so as to release the stress in the supporting layer 230. The supporting layer 230 will be patterned to form the first supporting layer 231 and the second supporting layer 232.

Figure 17A:
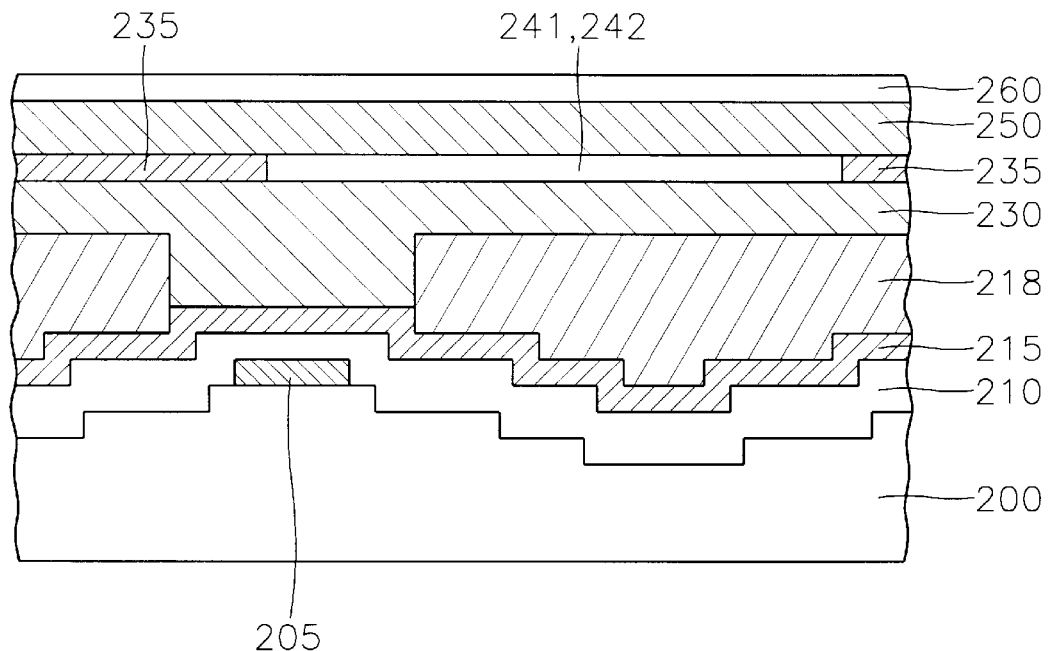
Figure 17B:
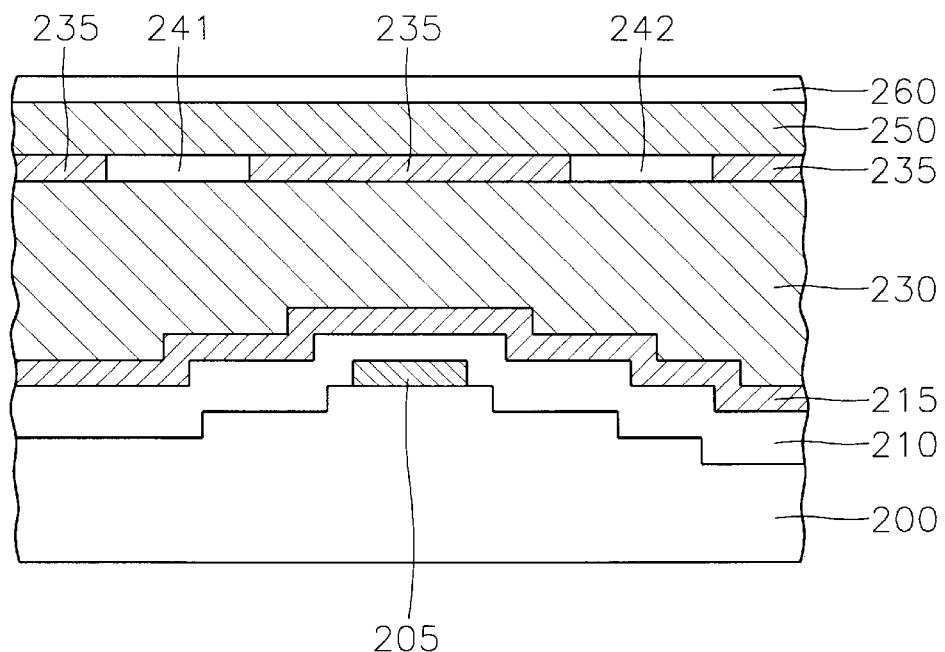

FIGS. 17A and 17B illustrate a state in which a top electrode layer 260 is formed.

Referring to FIGS. 17A and 17B, after a first photo-resist layer 235 is formed on the supporting layer 230 by a spin coating method, the first photo-resist 235 is patterned to expose a first portion and a second portion of the supporting layer 230 along the horizontal direction. As a result, the first portion and the second portion of the supporting layer 230 which are adjacent to the connecting terminal 205 are exposed as a rectangular shape. The first rectangular portion and the second rectangular portion are parallel to each other. After a bottom electrode layer is formed on the exposed rectangular portions of the supporting layer 230 and on the first photo-resist layer 235 by a sputtering method, the bottom electrode layer is patterned to form the first bottom electrode 241 on the first exposed rectangular portion of the supporting layer 230 considering the position on which the common line 305 will be formed. At the same time, the second bottom electrode 242 is formed on the second exposed rectangular portion of the supporting layer 230. So, the first bottom electrode 241 and the second bottom electrode 242 respectively have a rectangular shape. The first bottom electrode 241 and the second bottom electrode 242 are formed by using an electrically conductive metal such as platinum, tantalum, or platinum-tantalum so that the first bottom electrode 241 and the second bottom electrode 242 respectively have a thickness of between about 0.1 $\mu$m and 1.0 $\mu$m.

An active layer 250 is formed on the first bottom electrode 241, on the second bottom electrode 242, and on the first photo-resist layer 235. The active layer 250 is formed by using a piezoelectric material such as PZT (Pb(Zr, Ti)O$_3$) or PLZT ((Pb, La)(Zr, Ti)O$_3$) so that the active layer 250 has a thickness of between about 0.1 $\mu$m and 1.0 $\mu$m, preferably, about 0.4 $\mu$m. Also, the active layer 250 is formed by using an electrostrictive material such as PMN (Pb(Mg, Nb)O$_3$). The active layer 250 is formed by a sol-gel method, a sputtering method, or a CVD method. Subsequently, the active layer 250 is annealed by an RTA method and then the active layer 250 is polled. The active layer 250 will be patterned so as to form the first active layer 251 and the second layer 252.

A top electrode layer 260 is formed on the active layer 250. The top electrode layer 260 is formed by using an electrically conductive metal such as aluminum, platinum, or tantalum. The top electrode layer 260 is formed by a sputtering method or a CVD method so that the top electrode layer 260 has a thickness of between about 0.1 $\mu$m and 1.0 $\mu$m. The top electrode layer 260 will be patterned so as to form the first top electrode 261 and the second top electrode 262.

Figure 18A:
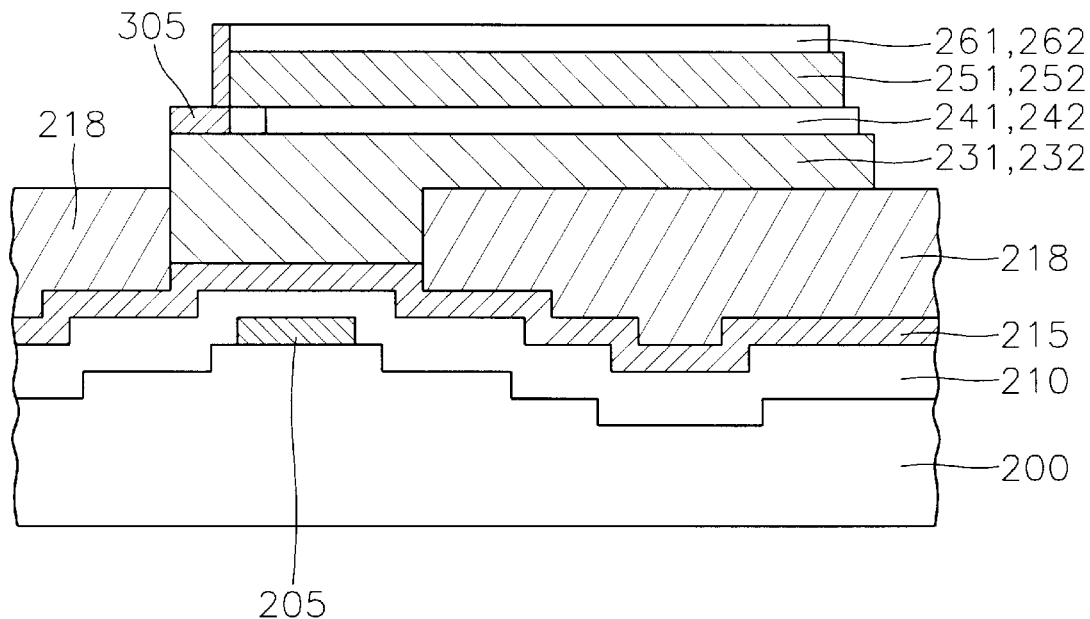
Figure 18B:
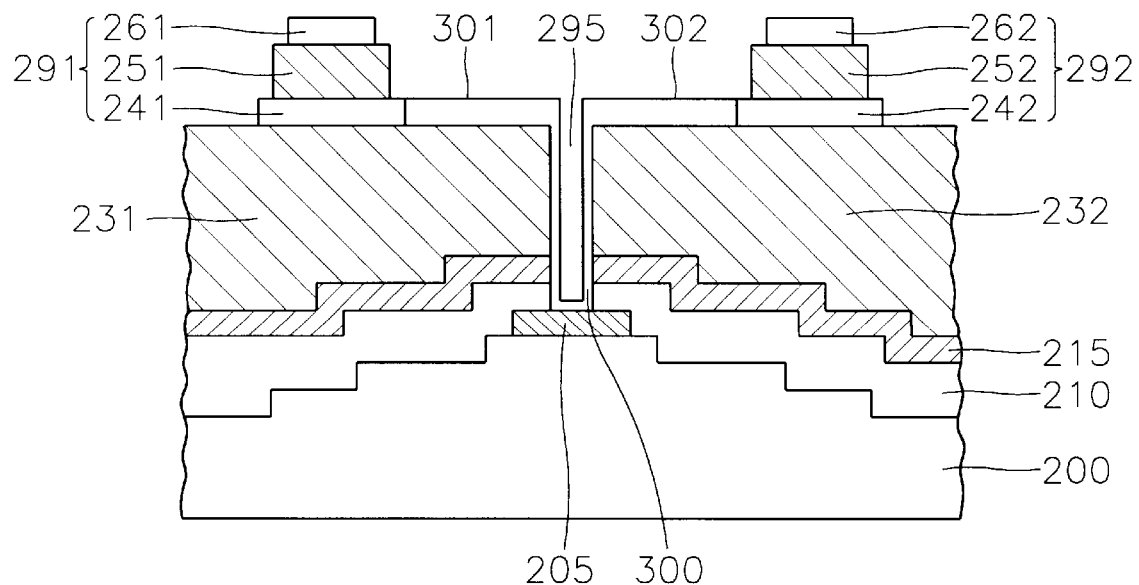

FIG. 18A illustrates a state in which the common line 305 is formed and FIG. 18B illustrates a state in which the via contact 300 is formed.

Referring to FIG. 18A, after a second photo-resist layer (not shown) is coated on the top electrode layer 260 by a spin coating method, the top electrode layer 260 is patterned so as to form the first top electrode 261 and the second top electrode 262 each of which has a rectangular shape by using the second photo-resist layer as an etching mask. Then, the second photo-resist layer is removed by etching. The first top electrode 261 is formed above the first bottom electrode 241 and the second top electrode 262 is formed above the second bottom electrode 242. Hence, the first top electrode 261 and the second top electrode 262 are parallel to each other.

The active layer 250 is patterned by the same method as that of the top electrode layer 260. That is, after a third photo-resist layer (not shown) is coated on the first top electrode 261, on the second top electrode 262, and on the active layer 250 by a spin coating method, the active layer 250 is patterned so as to form the first active layer 251 and the second active layer 252 by using the third photo-resist layer as an etching mask. The first active layer 251 has a rectangular shape which is wider than that of the first top electrode 261 and the second active layer 252 also has a rectangular shape which is wider than that of the second top electrode 262. In this case, the first active layer 251 is smaller than the first bottom electrode 241 and the second active layer 252 is smaller than the second bottom electrode 242. Then, the third photo-resist layer is removed by etching.

The supporting layer 230 is patterned so as to form the first supporting layer 231 and the second supporting layer 232 by the above-described method. The first supporting layer 231 has an L-shape and the second supporting layer 232 has a reverse L-shape. So, the first supporting layer 231 and the second supporting layer have an U-shape together.

The common line 305 is formed on the portion of the first portion of the first supporting layer 231 and on the portion of the first portion of the second supporting layer 232 after the first photo-resist layer 235 is removed. Namely, after a fourth photo-resist layer (not shown) is coated on the first supporting layer 231 and on the second supporting layer 232 by a spin coating method and then the fourth photo-resist is patterned to expose the portion of the first portion of the first supporting layer 231 and the portion of the first portion of the second supporting layer 232, the common line 305 is formed on the exposed portions of the first supporting layer 231 and the second supporting layer 232 by using an electrically conductive metal such as platinum, tantalum, platinum-tantalum, or aluminum. The common line 305 is formed by a sputtering method or a CVD method so that the common line 305 has a thickness of between about 0.5 μm and 2.0 μm. At that time, the common line 305 is separated from the first bottom electrode 241 and the second bottom electrode 242 by a predetermined distance and is attached to the first top electrode 261 and to the second top electrode 262. As it is described above, a voltage drop of the second signal can be minimized when the second signal passes the common line 305 because the common line 305 has a thick thickness in order to decrease its internal resistance. Thereby, a sufficient second signal is applied to the first top electrode 261 and to the second top electrode 262 through the common line 305, so an sufficient first electric field is generated between the first top electrode 261 and the first bottom electrode 262 and an sufficient second electric field is generated between the second top electrode 262 and the second bottom electrode 242, too.

Referring to FIG. 18B, a portion where the first supporting layer 231 and the second supporting layer are connected and portions which are adjacent to the portion where the first supporting layer 231 and the second supporting layer 232 are connected are exposed when the fourth photo-resist is patterned. The connecting terminal 205 is formed under the connected portion. The via hole 295 is formed from the connected portion to the connecting terminal 205 through the etch stop layer 215 and the passivation layer 210 by an etching. The via contact 300 is formed in the via hole 295 from the connecting terminal 205 to the connected portion. At the same time, the first connecting member 301 is formed on the first supporting layer 231 from the first bottom electrode 241 to the via contact 300 and the second connecting member 302 is formed on the second supporting layer 232 from the second bottom electrode 242 to the via contact 300. Thus, the via contact 300, the first connecting member 301, and the first bottom electrode 241 are connected one after another. Also, the via contact 300, the second connecting member 302, and the second bottom electrode 242 are connected one after another. The via contact 300, the first connecting member 301, and the second connecting member 302 are formed by using an electrically conductive metal such as platinum, tantalum, or platinum-tantalum. The first connecting member 301 and the second connecting member 302 has a thickness of between about 0.5 μm and 1.0 μm. Thereby, a voltage drop of the first signal can be minimized when the first signal passes the first connecting member 301 and the second connecting member 302 because the first connecting member 301 and the second connecting member 302 respectively have a thick thickness in order to decrease their internal resistances. Therefore, a sufficient first signal is applied to the first bottom electrode 241 through the via contact 300 and the first connecting member 301 and is applied to the second bottom electrode 242 through the via contact 300 and the second connecting member 302. The first actuating portion 291 having the first top electrode 261, the first active layer 251, the first bottom electrode 241, and the first supporting layer 231 and the second actuating portion 292 having the second top electrode 262, the second active layer 252, the second bottom electrode 242, and the second supporting layer 232 are completed after the fourth photo-resist is removed by etching.

Figure 19A:
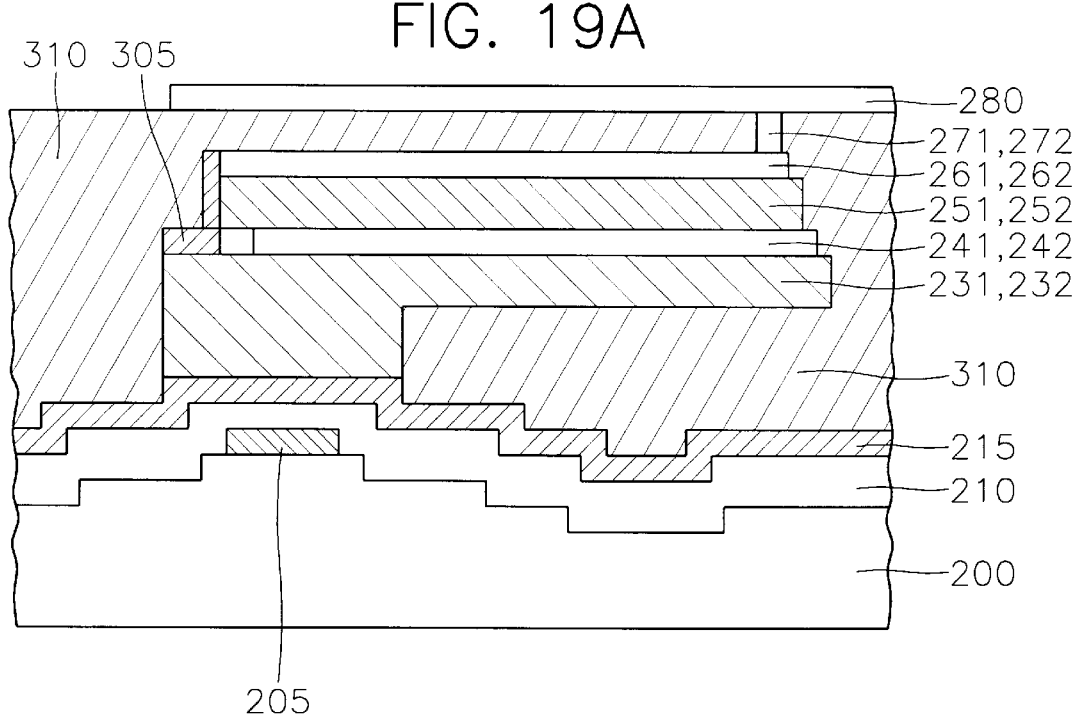
Figure 19B:
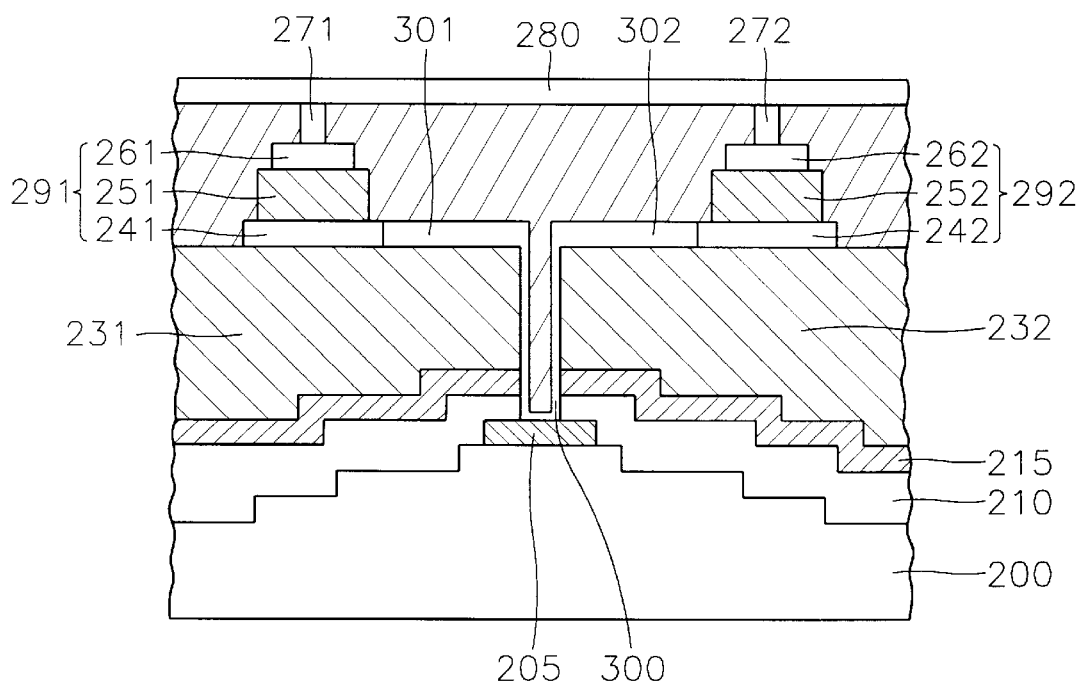

FIGS. 19A and 19B illustrate a state in which the reflecting member 280 is formed.

Referring to FIGS. 19A and 19B, after the first sacrificial layer 220 is removed by using a hydrogen fluoride vapor, a second sacrificial layer 310 is formed on the actuator 290 by using a polymer having a fluidity. The second sacrificial layer 310 is formed by a spin coating method so that the second sacrificial layer 310 covers the first top electrode 261 and the second top electrode 262. Subsequently, the second sacrificial layer 310 is patterned to expose a portion of the first top electrode 261 and a portion of the second top electrode 262. The first post 271 is formed on the exposed portion of the first top electrode 261 and the second post 272 is formed on the exposed portion of the second top electrode 262. The reflecting member 280 is formed on the first post 271, on the second post 272, and on the second sacrificial layer 310. The first post 271, the second post 272, and the reflecting member 280 are simultaneously formed by using a reflective metal such as aluminum, platinum, or silver. The first post 271, the second post 272, and the reflecting member 280 are formed by a sputtering method or a CVD method. Preferably, the reflecting member 280 for reflecting a incident light from a light source (not shown) is a mirror and has a thickness of between 0.1 μm and 1.0 μm. The reflecting member 280 has a rectangular plate shape to cover the first top electrode 261 and the second top electrode 262. As it is described above, the flatness of the reflecting member 280 may be enhanced because the reflecting member 280 is formed on the second sacrificial layer 310. The actuator 290 which the reflecting member 280 is formed thereon is completed as shown in FIGS. 6 and 7 after the second sacrificial layer 310 is removed by etching.

An ohmic contact (not shown) is formed on the bottom of the substrate 200 by using chrome, nickel, or gold after the substrate 200 having the actuator 290 is rinsed and dried. The ohmic contact is formed by a sputtering method or an evaporation method. The substrate 200 is cut to prepare for TCP bonding in order to apply the first signal to the first bottom electrode 241 and to the second bottom electrode 242 and the second signal to the first top electrode 261 and to the second top electrode 262. Then, an panel pad (not shown) of the thin film AMA and a pad of TCP are connected so that the thin film AMA module is completed.

The operation of the thin film AMA in an optical projection system according to the second embodiment of the present invention will be described.

In the thin film AMA according to the present embodiment, the second signal (the bias current signal) is applied to the first top electrode 261 and to the second top electrode 262 via the pad of TCP, the panel pad of AMA, and the common line 305. At the same time, the first signal (the picture current signal) is applied to the first bottom electrode 241 via the pad of TCP, the panel pad of AMA, the electrical wiring, the connecting terminal 205, the via contact 300, and the first connecting member 301. The first signal is also applied to the second bottom electrode 242 via the pad of TCP, the panel pad of AMA, the electrical wiring, the connecting terminal 205, the via contact 300, and the second connecting member 302. Thereby, the first electric field is generated between the first top electrode 261 and the first bottom electrode 241 and the second electric field is generated between the second top electrode 262 and the second bottom electrode 242. The first active layer 251 formed between the first top electrode 261 and the first bottom electrode 241 is deformed by the first electric field and the second active layer 252 formed between the second top electrode 262 and the second bottom electrode 242 is deformed by the second electric field. The first active layer 251 is deformed in the direction perpendicular to the first electric field and the second active layer 252 is deformed in the direction perpendicular to the second electric field. The first active layer 251 actuates in the direction opponent to the first supporting layer 231 and the second active layer 252 actuates in the direction opponent to the second supporting layer 232. That is, the first actuating portion 291 having the first active layer 251 and the second actuating portion 292 having the second active layer 252 respectively actuate upward by a predetermined tilting angle.

The reflecting member 280 for reflecting the incident light from the light source is tilted with the first actuating portion 291 and with the second actuating portion 292 because the reflecting member 280 is supported by the first post 271 and by the second post 272 and is formed on the actuator 290. Hence, the reflecting member 280 reflects the light onto the screen, so the picture is projected onto the screen.

As it is described above, in the thin film actuated mirror array in an optical projection system according to the present invention, the electrical wiring and the connecting terminal which are formed on the substrate may not be damaged because the actuator is formed on a portion of the substrate which is adjacent to the portion where the electrical wiring and the connecting terminal are formed. In addition, the voltage drop of the second signal can be minimized because the common line is formed thickly on a portion of the actuator, so the sufficient second signal is applied to the first top electrode and to the second top electrode. Thereby, the sufficient electric fields are generated between the first top electrode and the first bottom electrode and between the second top electrode and the second bottom electrode. Furthermore, the flatness of the reflecting member may be enhanced because the reflecting member is formed on the second sacrificial layer after the second sacrificial layer is formed on the actuator and the reflecting member is supported by the first post and by the second post.

Although preferred embodiments of the present invention have been described, it is understood that the present invention should not be limited to this preferred embodiments, but various changes and modifications can be made by one skilled in the art within the spirit and scope of the invention as hereinafter claimed.

What is claimed is:

1. A thin film actuated mirror array in an optical projection system being actuated by a first signal and a second signal, said thin film actuated mirror array comprising:

a substrate having an electrical wiring and a connecting terminal for receiving the first signal from outside and transmitting the first signal;

an actuator comprising a supporting layer formed on said substrate, a bottom electrode for receiving the first signal, said bottom electrode being formed on said supporting layer, a top electrode corresponding to said bottom electrode for receiving the second signal and generating an electric field between said top electrode and said bottom electrode, and an active layer formed between said top electrode and said bottom electrode and deformed by the electric field;

a common line for applying the second signal to said top electrode, said common line being formed on a portion of said actuator and being connected to said top electrode and to an adjacent top electrode of an adjacent actuator; and a reflecting means for reflecting a light, said reflecting means being formed on said top electrode.

2. The thin film actuated mirror array in an optical projection system as claimed in claim 1, wherein said bottom electrode, said active layer, and said top electrode respectively have a rectangular shape.

3. The thin film actuated mirror array in an optical projection system as claimed in claim 2, wherein said bottom electrode is formed on a central portion of said supporting layer, said active layer is smaller than said bottom electrode, and said top electrode is smaller than said active layer.

4. The thin film actuated mirror array in an optical projection system as claimed in claim 1, wherein said actuator further comprises a via contact for transmitting the first signal from said connecting terminal to said bottom electrode, said via contact being formed in a via hole which is formed from a portion of said supporting layer to said connecting terminal; and a connecting means for connecting said via contact to said bottom electrode, said connecting means being formed from said via contact to said bottom electrode.

5. The thin film actuated mirror array in an optical projection system as claimed in claim 4, wherein said via contact and said connecting means are composed of an electrically conductive metal.

6. The thin film actuated mirror array in an optical projection system as claimed in claim 5, wherein said via contact and said connecting means are composed of platinum, tantalum, or platinum-tantalum.

7. The thin film actuated mirror array in an optical projection system as claimed in claim 1, wherein said supporting layer is composed of a rigid material, said bottom electrode is composed of an electrically conductive metal, said active layer is composed of a piezoelectric material or an electrostrictive material, and said top electrode is composed of an electrically conductive metal.

8. The thin film actuated mirror array in an optical projection system as claimed in claim 1, wherein said common line is comprised of an electrically conductive metal.

9. The thin film actuated mirror array in an optical projection system as claimed in claim 8, wherein said common line is composed of platinum, tantalum, platinum-tantalum, aluminum, or silver to have a thickness of between 0.5 μm and 2.0 μm.

10. The thin film actuated mirror array in an optical projection system as claimed in claim 1, wherein said top electrode further comprises a post for supporting said reflecting means, said post being formed between a portion of said top electrode and said reflecting means, and said reflecting means has a rectangular plate shape.

11. The thin film actuated mirror array in an optical projection system as claimed in claim 1, wherein said reflecting means is composed of a reflective metal.

12. A thin film actuated mirror array in an optical projection system being actuated by a first signal and a second signal, said thin film actuated mirror array comprising:
    a substrate having, an electrical wiring, and a connecting terminal for receiving the first signal from outside and transmitting the first signal;
    an actuator comprising a first actuating portion having a first supporting layer formed on a first portion of said substrate, a first bottom electrode for receiving the first signal, said first bottom electrode being formed on said first supporting layer, a first top electrode corresponding to said first bottom electrode for receiving the second signal and generating a first electric field between said first top electrode and said first bottom electrode, and a first active layer formed between said first top electrode and said first bottom electrode and deformed by the first electric field; and a second actuating portion having a second supporting layer formed on a second portion of said substrate and connected to said first supporting layer, a second bottom electrode for receiving the first signal, said second bottom electrode being formed on said second supporting layer, a second top electrode corresponding to said second bottom electrode for receiving the second signal and generating a second electric field between said second top electrode and said second bottom electrode, a second active layer formed between said second top electrode and said second bottom electrode and deformed by the second electric field;
    a common line for applying the second signal to said first top electrode and to said second top electrode, said common line being formed on a portion of said actuator and being connected to said first top electrode and to said second top electrode; and
    a reflecting means for reflecting a light, said reflecting means being formed on said actuator.

13. The thin film actuated mirror array in an optical projection system as claimed in claim 12, wherein said first bottom electrode and said second bottom electrode respectively have a rectangular shape, said first active layer and said second active layer respectively have a rectangular shape, and said first top electrode and said second top electrode respectively have a rectangular shape.

14. The thin film actuated mirror array in an optical projection system as claimed in claim 13, wherein said first active layer and said second active layer are respectively smaller than said first bottom electrode and said second bottom electrode, and said first top electrode and said second top electrode are respectively smaller than said first active layer and said second active layer.

15. The thin film actuated mirror array in an optical projection system as claimed in claim 12, wherein said first supporting layer and said second supporting layer together have a U-shape.

16. The thin film actuated mirror array in an optical projection system as claimed in claim 12, wherein said actuator further comprises a via contact for transmitting the first signal from said connecting terminal to said first bottom electrode and to said second bottom electrode, said via contact being formed from a portion where said first supporting layer and said second supporting layer are connected to each other to said connecting terminal; a first connecting means for connecting said via contact to said first bottom electrode, said connecting means being formed from said via contact to said first bottom electrode; and a second connecting means for connecting said via contact to said second bottom electrode, said second connecting means being formed from said via contact to said second bottom electrode.

17. The thin film actuated mirror array in an optical projection system as claimed in claim 16, wherein said via contact, said first connecting means, and said second connecting means are composed of an electrically conductive metal.

18. The thin film actuated mirror array in an optical projection system as claimed in claim 12, wherein said first supporting layer and said second supporting layer are composed of a rigid material, said first bottom electrode and said second bottom electrode are composed of an electrically conductive metal, said first active layer and said second active layer are composed of a piezoelectric material or an electrostrictive material, and said first top electrode and said second top electrode are composed of an electrically conductive metal.

19. The thin film actuated mirror array in an optical projection system as claimed in claim 12, wherein said common line is composed of an electrically conductive metal to have a thickness of between 0.5 μm and 2.0 μm.

20. The thin film actuated mirror array in an optical projection system as claimed in claim 12, wherein said first top electrode comprises a first post for supporting said reflecting means, said first post being formed between a portion of said first top electrode and said reflecting means, said second top electrode comprises a second post for supporting said reflecting means, said second post being formed between a portion of said second top electrode and said reflecting means, and said reflecting means has a rectangular plate shape.

21. A method for manufacturing a thin film actuated mirror array in an optical projection system being actuated by a first signal and a second signal, said method comprising the steps of:
    providing a substrate having an electrical wiring and a connecting terminal for receiving the first signal from outside and transmitting the first signal;
    forming a first layer on said substrate;
    forming a bottom electrode layer on said first layer and patterning said bottom electrode layer to form a bottom electrode for receiving the first signal;
    forming a second layer and a top electrode layer on said bottom electrode;
    forming an actuator by patterning said top electrode layer to form a top electrode for receiving the second signal and generating an electric field, by patterning said second layer to form an active layer deformed by the electric field, and by patterning said first layer to form a supporting layer beneath said bottom electrode;

forming a common line on a portion of said actuator so as to be connected to said top electrode and to an adjacent top electrode of an adjacent actuator; and forming a reflecting means for reflecting a light on said actuator.

22. The method for manufacturing the thin film actuated mirror array in an optical projection system as claimed in claim 21, wherein the step of forming said first layer is performed by a low pressure chemical vapor deposition method by using a nitride or a metal, the steps of forming said bottom electrode layer and said top electrode layer are performed by a sputtering method or a chemical vapor deposition method by using an electrically conductive metal, and the step of forming said second layer is performed by a sol-gel method, a sputtering method, or a chemical vapor deposition method by using a piezoelectric material or an electrostrictive material.

23. The method for manufacturing the thin film actuated mirror array in an optical projection system as claimed in claim 21, wherein the step of forming said second layer further comprises annealing said second layer by a rapid thermal annealing method and polling said second layer.

24. The method for manufacturing the thin film actuated mirror array in an optical projection system as claimed in claim 21, wherein the step of forming said actuator further comprises forming a via hole from a portion of said active layer to said connecting terminal through said bottom electrode and said first layer, forming a via contact in the via hole, and forming a connecting means for connecting said via contact to said bottom electrode.

25. The method for manufacturing the thin film actuated mirror array in an optical projection system as claimed in claim 24, wherein the step of forming said via contact and said connecting means are performed by a sputtering method or a chemical vapor deposition method by using an electrically conductive metal.

26. The method for manufacturing the thin film actuated mirror array in an optical projection system as claimed in claim 21, the step of forming said common line is performed by a sputtering method or a chemical deposition method by using, platinum, tantalum, platinum-tantalum, aluminum, or silver.

27. The method for manufacturing the thin film actuated mirror array in an optical projection system as claimed in claim 21, wherein the step of forming said reflecting means is performed after forming a sacrificial layer on said actuator and patterning the sacrificial layer to expose a portion of said top electrode, and the step of forming said reflecting means is performed by a sputtering method or a chemical vapor deposition method by using a reflective metal.

28. A method for manufacturing a thin film actuated mirror array in an optical projection system being actuated by a first signal and a second signal, said method for manufacturing the thin film actuated mirror array in an optical projection system comprising the steps of:

providing a substrate having an electrical wiring and a connecting terminal for receiving the first signal from outside and transmitting the second signal;

forming a first layer on said substrate;

forming a bottom electrode layer on said first layer and patterning said bottom electrode layer to form a first bottom electrode and a second bottom electrode for receiving the first signal;

forming an active layer and a top electrode layer on said first layer, on said first bottom electrode, and on said second bottom electrode;

forming an actuator comprising the step of forming a first actuating portion and a second actuating portion by patterning said top electrode layer to form a first top electrode and a second top electrode for receiving the second signal and respectively generating a first electric field and a second electric field, by patterning said active layer to form a first active layer and a second active layer respectively deformed by the first electric field and the second electric field, and by patterning said first layer to form a first supporting layer beneath said first bottom electrode and to form a second supporting layer beneath said second bottom electrode;

forming a common line on a portion of said actuator, said common line being connected to said first top electrode and to said second top electrode; and forming reflecting means for reflecting a light on said actuator.

29. The method for manufacturing the thin film actuated mirror array in an optical projection system as claimed in claim 28, wherein the step of forming said actuator further comprises forming a via hole from a portion where said first supporting layer and said second supporting layer are connected to each other to said connecting terminal, and forming a via contact in the via hole, forming a first connecting means from said via contact to said first bottom electrode, and forming a second connecting means from said via contact to said second bottom electrode.

* * * * *